United States Patent
Harshawat et al.

(10) Patent No.: US 11,949,941 B2
(45) Date of Patent: *Apr. 2, 2024

(54) DYNAMIC CONTEXT-BASED VIDEO STREAMING OVERLAY GENERATION

(71) Applicant: Haystack TV, Inc., San Francisco, CA (US)

(72) Inventors: Ish Harshawat, San Francisco, CA (US); Enrique Valeriano Loli, Lima (PE)

(73) Assignee: Haystack TV, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/818,664

(22) Filed: Aug. 9, 2022

(65) Prior Publication Data
US 2022/0385966 A1    Dec. 1, 2022

Related U.S. Application Data

(63) Continuation of application No. 17/192,820, filed on Mar. 4, 2021, now Pat. No. 11,432,034.
(Continued)

(51) Int. Cl.
| | |
|---|---|
| *H04N 21/431* | (2011.01) |
| *G06F 3/01* | (2006.01) |
| *G06F 3/048* | (2013.01) |
| *G06F 3/0481* | (2022.01) |
| *G06F 3/0484* | (2022.01) |
| *G06F 9/451* | (2018.01) |
| *H04N 21/435* | (2011.01) |
| *H04N 21/475* | (2011.01) |
| *H04N 21/485* | (2011.01) |

(Continued)

(52) U.S. Cl.
CPC .......... *H04N 21/4314* (2013.01); *G06F 3/01* (2013.01); *G06F 3/048* (2013.01); *G06F 3/0481* (2013.01); *G06F 3/0484* (2013.01); *G06F 9/451* (2018.02); *H04N 21/4316* (2013.01); *H04N 21/435* (2013.01); *H04N 21/4755* (2013.01); *H04N 21/4758* (2013.01); *H04N 21/4858* (2013.01); *H04N 21/4882* (2013.01); *H04N 21/8126* (2013.01)

(58) Field of Classification Search
CPC .......... H04N 21/4314; H04N 21/4316; H04N 21/435; H04N 21/4755; H04N 21/4758; H04N 21/4858; H04N 21/4882; H04N 21/8126; G06F 9/451; G06F 3/01; G06F 3/048; G06F 3/0481; G06F 3/0484
USPC .......................................................... 725/37
See application file for complete search history.

(56) References Cited

U.S. PATENT DOCUMENTS 9,393,495 B1 * 7/2016 Off ........................ G06F 16/958
10,079,839 B1   9/2018 Bryan et al.
(Continued)

OTHER PUBLICATIONS

U.S. Appl. No. 17/192,820, Advisory Action dated Jan. 24, 2022, 3 pgs.
(Continued)

*Primary Examiner* — Dominic D Saltarelli
(74) *Attorney, Agent, or Firm* — Kwan & Olynick LLP

(57) ABSTRACT

Disclosed are some implementations of systems, apparatus, methods and computer program products for customizing and dynamically generating overlay graphical user interfaces (GUIs) within the context of a video streaming environment.

38 Claims, 18 Drawing Sheets

Related U.S. Application Data

(60) Provisional application No. 63/063,224, filed on Aug. 8, 2020.

(51) Int. Cl.
*H04N 21/488* (2011.01)
*H04N 21/81* (2011.01)

(56) References Cited

U.S. PATENT DOCUMENTS

| | | | |
|---|---|---|---|
| 10,587,930 | B2 | 3/2020 | Chane et al. |
| 10,915,705 | B1 | 2/2021 | Wehrman et al. |
| 11,146,847 | B1 | 10/2021 | Harshawat et al. |
| 11,432,034 | B2 | 8/2022 | Harshawat et al. |
| 2005/0094032 | A1 | 5/2005 | Rogitz |
| 2011/0252450 | A1* | 10/2011 | Adrick ............. H04N 21/41415 725/62 |
| 2014/0143687 | A1 | 5/2014 | Tan et al. |
| 2014/0309804 | A1 | 10/2014 | Ricci |
| 2016/0224909 | A1 | 8/2016 | Garrard et al. |
| 2016/0234564 | A1 | 8/2016 | Holyoak |
| 2017/0150213 | A1 | 5/2017 | Cremer et al. |
| 2017/0357655 | A1 | 12/2017 | Marchiori et al. |
| 2018/0146217 | A1 | 5/2018 | Kedenburg, III |
| 2019/0261025 | A1 | 8/2019 | Hussain et al. |
| 2019/0281343 | A1 | 9/2019 | Hussain et al. |
| 2019/0370320 | A1* | 12/2019 | Kalra ................... G06K 7/1404 |
| 2020/0068231 | A1* | 2/2020 | Perez ............. H04N 21/26291 |
| 2020/0073919 | A1* | 3/2020 | Beno ..................... G06F 40/186 |
| 2020/0128287 | A1* | 4/2020 | Maimon ................. G06F 16/44 |
| 2020/0272306 | A1* | 8/2020 | Barkman ............. H04N 21/235 |
| 2021/0037283 | A1* | 2/2021 | Cremer ............. H04N 21/4383 |
| 2021/0185378 | A1* | 6/2021 | Rajendran .......... H04N 21/4532 |
| 2021/0274240 | A1* | 9/2021 | Aher ..................... G06F 40/253 |
| 2021/0334817 | A1* | 10/2021 | Boston ................ H04L 63/0442 |
| 2022/0046312 | A1 | 2/2022 | Harshawat et al. |
| 2022/0046313 | A1 | 2/2022 | Harshawat et al. |

OTHER PUBLICATIONS

U.S. Appl. No. 17/192,820, Examiner Interview Summary dated Oct. 20, 2021, 2 pgs.
U.S. Appl. No. 17/192,820, Examiner Interview Summary dated Dec. 29, 2021, 2 pgs.
U.S. Appl. No. 17/192,820, Final Office Action dated Oct. 26, 2021, 22 pgs.
U.S. Appl. No. 17/192,820, Non-Final Office Action dated Jul. 14, 2021, 19 pgs.
U.S. Appl. No. 17/192,820, Notice of Allowance dated Apr. 25, 2022, 9 pgs.
U.S. Appl. No. 17/192,820, Notice of Allowance dated May 9, 2022, 3 pgs.
U.S. Appl. No. 17/192,822, Notice of Allowance dated Jun. 14, 2021, 9 pgs.
U.S. Appl. No. 17/473,916, USPTO e-Office Action: CTNF—Non-Final Rejection, dated Jan. 17, 2023, 20 pages.

* cited by examiner

448

```
{
    "name": "ticker_main_box",
    "frame": "0px 1000px 1700px 80px",
    "intro_transition": {
        "name": "ticker_up",
        "duration": 500,
        "delay": 0,
        "triggers": [
            "$start_fullscreen",
            "$end_ad"
        ]
    },
    "outro_transition": {
        "name": "ticker_down",
        "duration": 2000,
        "delay": 1300,
        "triggers": [
            "$start_ad",
            "$end_fullscreen"
        ]
    },
    "background_color": "#04233C"
}
```

*Figure 4D*

```
                                              ┌─ 452
┌─────────────────────────────────────────────────────┐
│  {                                                  │
│    "name": "weather_others_widget",                 │
│    "elements": [                                    │
│      {                                              │
│        "type": "text",                              │
│        "color": "#EAE8E2",                          │
│        "font_style": "bold",                        │
│        "font_size": "26px",                         │
│        "frame": "0px 10px 0px 30px",                │
│        "id": "txt_weather_others_widget_label"      │
│      },                                             │
│      {                                              │
│        "type": "text",                              │
│        "color": "#EAE8E2",                          │
│        "font_style": "normal",                      │
│        "font_size": "33px",                         │
│        "frame": "+0px 4px 0px 40px",                │
│        "id": "txt_weather_others_widget_value"      │
│      },                                             │
│      {                                              │
│        "type": "text",                              │
│        "color": "#EAE8E2",                          │
│        "font_style": "normal",                      │
│        "font_size": "26px",                         │
│        "frame": "+4px 10px 0px 30px",               │
│        "id": "txt_weather_others_widget_metric"     │
│      },                                             │
│      ...                                            │
│    ]                                                │
│  }                                                  │
└─────────────────────────────────────────────────────┘
```

*Figure 4F*

```
                                       ┌─ 450
┌──────────────────────────────────────────────────┐
│  {                                               │
│    "name": "weather_others",                     │
│    "background_color": "#04253C",                │
│    "page_interval": 4,                           │
│    "bottom_extended": {...},                     │
│    "template": "weather_expanded",               │
│    "overlay_intro_transition": {...},            │
│    "overlay_outro_transition": {...},            │
│    "element_transitions": [...],                 │
│    "elements": [                                 │
│      {                                           │
│        "type": "text",                           │
│        "color": "#EAE8E2",                       │
│        "font_style": "bold",                     │
│        "font_size": "33px",                      │
│        "frame": "270px 16px 53px 39px",          │
│        "bar_align": "center",                    │
│        "intro_transition": {                     │
│          "name": "fade_and_move_right_intro",    │
│          "duration": 250,                        │
│          "delay": 0                              │
│        },                                        │
│        "outro_transition": {                     │
│          "name": "fade_and_move_right_outro",    │
│          "duration": 250,                        │
│          "delay": 1600                           │
│        },                                        │
│        "id": "txt_weather_temp"                  │
│      },                                          │
│      {                                           │
│        "type": "element_group",                  │
│        "frame": "376px 14px 0px 40px",           │
│        "template": "weather_others_widget",      │
│        "intro_transition": {                     │
│          "name": "fade_and_move_up_intro",       │
│          "duration": 250,                        │
│          "delay": 500                            │
│        },                                        │
│        "outro_transition": {                     │
│          "name": "fade_out_and_move_up_outro",   │
│          "duration": 250,                        │
│          "delay": 1450                           │
│        },                                        │
│        "id": "eg_weather_other_sunrise"          │
│      },                                          │
│      ...                                         │
│    ]                                             │
│  }                                               │
└──────────────────────────────────────────────────┘
```

*Figure 4E*

```
{
  "template": "weather_others",
  "params": {
    "tab_blue": {
      "text": "Weather"
    },
    "txt_weather_temp": {
      "text": "67°F"
    },
    "eg_weather_other_sunrise": {
      "childParams": {
        "txt_weather_others_widget_label": {
          "text": "Sunrise"
        },
        "txt_weather_others_widget_value": {
          "text": "06:03"
        },
        "txt_weather_others_widget_metric": {
          "text": "AM"
        }
      }
    },
    "eg_weather_other_sunset": { },
    "eg_weather_other_uvindex": { },
    "eg_weather_other_visibility": { },
    "ext_seemore_visual_cue": {
      "childParams": {
        "highlightedParams": {
          "img": "https://dn6a4f0q0kn23.cloudfront.net/images/overlays/visual_cue_arrow_focused.png"
        },
        "visual_cue_arrow": { },
        "visual_cue_text": {
          "text": "SEE MORE"
        }
      }
    },
    "bottom_extended_params": "[HS_API]/api/v1/overlays/weather?channel=&rotation=0&fields=bottom_extended_params"
  }
}
```

*Figure 4G*

```
{
  "template": "stocks_currency",
  "params": {
    "tab_blue": {
      "text": "Stocks"
    },
    "eg_stocks_index_1": [▒],
    "eg_stocks_index_2": [▒],
    "eg_stocks_index_3": [▒],
    "ext_seemore_visual_cue": {
      "childParams": {
        "visual_cue_arrow": {
          "img": "https://dn6q4f0q0kh23.cloudfront.net/images/overlays/visual_cue_arrow.png"
        },
        "visual_cue_text": {
          "text": "SEE MORE"
        }
      },
      "highlightedParams": {
        "visual_cue_arrow": {
          "img": "https://dn6q4f0q0kh23.cloudfront.net/images/overlays/visual_cue_arrow_focused.png"
        },
        "visual_cue_text": {
          "text": "SEE MORE"
        }
      }
    },
    "bottom_extended_params": "[HS_API]/api/v1/overlays/stocks?channel=&rotation=@&fields=bottom_extended_params"
  }
}
```

```
{
  "name": "stocks_currency",
  "background_color": "#04233C",
  "page_interval": 4,
  "bottom_extended": {
    "template": "stocks_expanded",
    "overlay_intro_transition": {
      "name": "tab_expand",
      "duration": 500,
      "delay": 200
    },
    "overlay_outro_transition": {
      "name": "tab_compress",
      "duration": 500,
      "delay": 200
    },
    "element_transitions": [▭]
  },
  "elements": [▭]
},
{
  "name": "stocks_expanded",
  "background_color": "#04233C",
  "elements": [
    {
      "type": "tab_layout",
      "frame": "0px 0px 1920px 80px",
      "content_height": "316px",
      "color": "#021E33",
      "tab_color": "#1A3345",
      "tab_focus_color": "#EAE8E2",
      "tab_template": "tab_stocks_header",
      "focused_tab_template": "tab_stocks_header_focused",
      "content_templates": [
        "tab_stocks_index"
      ],
      "id": "tab_stocks"
    }
  ]
}
```

DYNAMIC CONTEXT-BASED VIDEO STREAMING OVERLAY GENERATION

INCORPORATION BY REFERENCE

An Application Data Sheet is filed concurrently with this specification as part of the present application. Each application that the present application claims benefit of or priority to as identified in the concurrently filed Application Data Sheet is incorporated by reference herein in its entirety and for all purposes.

COPYRIGHT NOTICE

A portion of the disclosure of this patent document contains material which is subject to copyright protection. The copyright owner has no objection to the facsimile reproduction by anyone of the patent document or the patent disclosure as it appears in the United States Patent and Trademark Office patent file or records but otherwise reserves all copyright rights whatsoever.

FIELD OF TECHNOLOGY

This patent document relates generally to systems and techniques associated with dynamic generation of context-based interfaces, and more specifically to the dynamic generation and rendering of context-based interfaces within a video streaming system.

BACKGROUND

Content that is broadcast by television stations include channels with on-demand content as well as live broadcasts. Broadcast content can be distributed to an unlimited number of devices through an electronic communication medium. As result, broadcast content can be a powerful tool in disseminating information that can benefit the masses.

Broadcast content can include a wide variety of programming. In some instances, the broadcast content includes current information such as news, stock information, or weather forecasts. This information is often presented in the form of a ticker that is positioned at a constant position within frames of the broadcast content. Since the information is transmitted to client devices in conjunction with the programming, it is possible to efficiently transmit information to a wide audience.

BRIEF DESCRIPTION OF THE DRAWINGS

The included drawings are for illustrative purposes and serve only to provide examples of possible structures and operations for the disclosed inventive systems, apparatus, methods and computer program products for facilitating the dynamic generation of context-based interfaces within a video streaming system. These drawings in no way limit any changes in form and detail that may be made by one skilled in the art without departing from the spirit and scope of the disclosed implementations.

FIGS. 4D-4G show examples of overlay templates and associated overlay information that may be used to dynamically generate a ticker such as that shown in FIG. 4C.

FIGS. 4I-4K show examples of overlay templates and associated overlay information that may be used to dynamically generate a ticker such as that shown in FIG. 4H.

DETAILED DESCRIPTION

Figure 1:
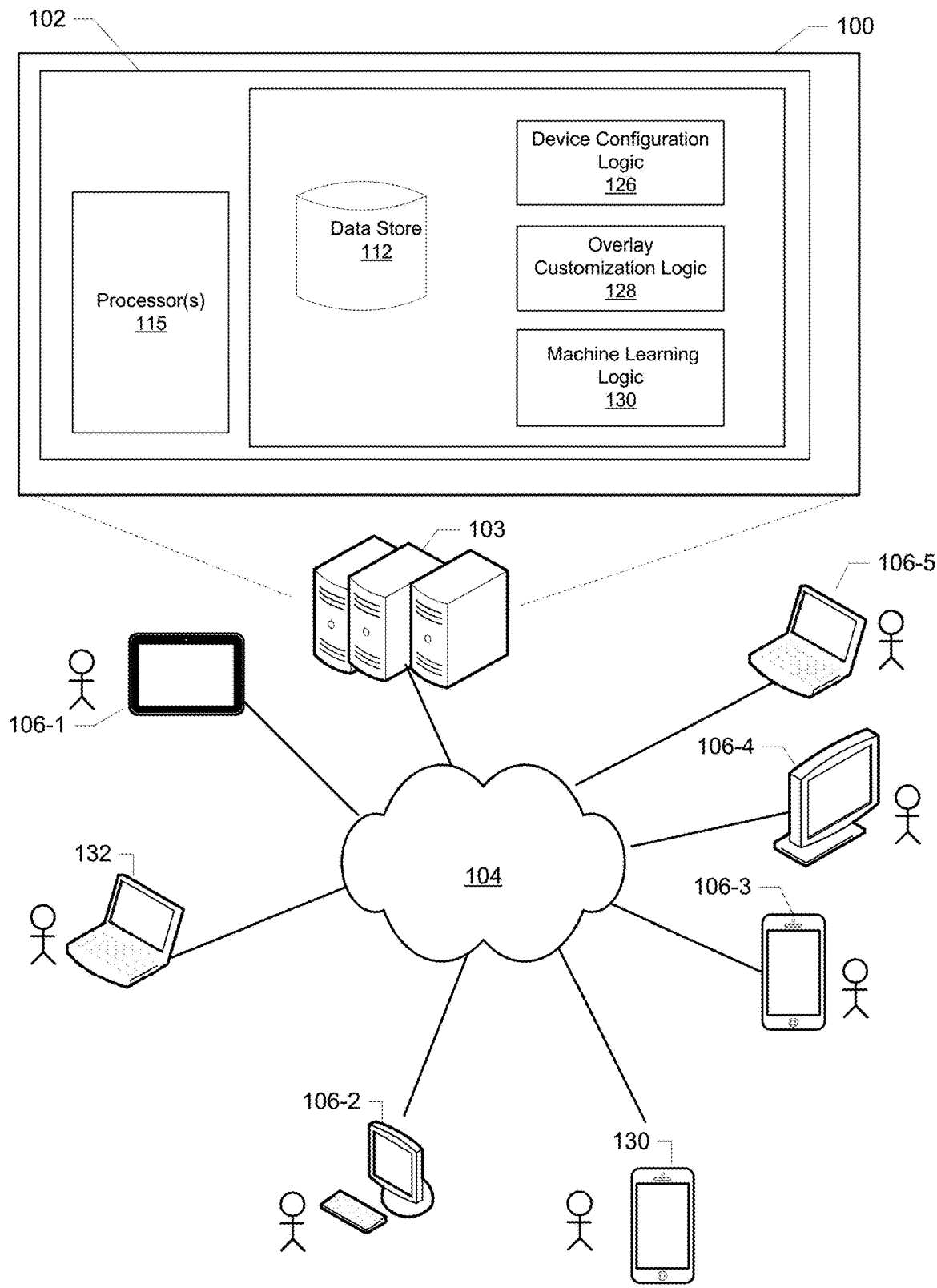
FIG. 1 shows a diagram of an example of a computing environment 100 in which an overlay management system 102 may be implemented, in accordance with some implementations.

Examples of systems, apparatus, methods and computer program products according to the disclosed implementations are described in this section. These examples are being provided solely to add context and aid in the understanding of the disclosed implementations. It will thus be apparent to one skilled in the art that implementations may be practiced without some or all of these specific details. In other instances, certain operations have not been described in detail to avoid unnecessarily obscuring implementations. Other applications are possible, such that the following examples should not be taken as definitive or limiting either in scope or setting.

In the following detailed description, references are made to the accompanying drawings, which form a part of the description and in which are shown, by way of illustration, specific implementations. Although these implementations are described in sufficient detail to enable one skilled in the art to practice the disclosed implementations, it is understood that these examples are not limiting, such that other implementations may be used and changes may be made without departing from the spirit and scope of the disclosure.

Traditionally, systems have broadcast information such as news, stock or weather information simultaneous with the original television content. This wide distribution of information is advantageous since it provides an unlimited number of viewers with information that may be relevant to them. However, these systems have a number of limitations. This supplemental information is typically rendered within a specific segment of the screen via mechanisms such as tickers. While this information can be informative, the information is unidirectional and cannot be interacted with. In addition, all viewers receive the same information regardless of their preferences or interests. This can result in viewer frustration and dissatisfaction.

With the shift of audiences from television to digital content, television stations are shifting from traditional broadcast, cable, and satellite delivery systems to distribution over the Internet, commonly referred to as Internet Protocol television (IPTV). The disclosed implementations facilitate the generation of customized overlays at client devices through the transmission of messages over the Internet. In accordance with various implementations, an overlay declarative language is implemented to facilitate the dynamic generation of overlays within a video streaming environment. An overlay declarative language may be defined through the use of one or more overlay definitions. An overlay definition includes overlay instructions (e.g., overlay template(s)) configurable to define a layout of a corresponding overlay that may be dynamically generated according to overlay information that is generated and customized, in real-time, on per-client basis. The overlay information may identify specific overlay instructions (e.g. templates) that are to be applied, as well as include overlay data that will be bound to the templates.

In some implementations, the overlay instructions include variable(s) for which value(s) may be provided in the overlay information. A variable may act as a macro that is used to guide the overlay generation process. For example, a variable may direct an action by providing a parameter for an action identified in a template. A variable may also act as a parameter for a variety of overlay generation features represented in the template, as described herein.

Some implementations of the disclosed systems, apparatus, methods and computer program products are configured to facilitate the dynamic generation of overlays within the context of a video streaming environment. In some implementations, a server system is configured to dynamically generate and transmit customized overlay information to a client device that enables the client device to dynamically generate an overlay that is rendered in conjunction with video content during playback of the video content. Customization may include the selection of overlay instructions, as well as data that is pertinent to the overlay instructions.

In some implementations, an overlay engine is configured to operate at a client device to interpret customized overlay information it receives from a server system and pertinent overlay instructions to dynamically generate, in real-time, an overlay interface simultaneous with rendering video content. The overlay engine may include computer-readable instructions configured to "interpret" the overlay instructions and overlay information, as well as be configured to execute computer-readable instructions of the overlay engine as designated by the overlay information and corresponding overlay instructions.

In accordance with various implementations, a server system facilitates the customization of overlays for presentation by a client device through the communication of overlay instructions to the client device. Overlay instructions can be communicated to the client device via a set of one or more overlay templates. Each overlay template includes a set of computer-readable instructions configurable to facilitate the generation of an overlay of a corresponding overlay type. More particularly, an overlay template may serve as a "layout" for generation of a corresponding overlay. Example overlay types include, but are not limited to, a stock ticker overlay, a voting poll overlay, a news overlay, and a calendar notification overlay. Overlay instructions can be transmitted to the client device during an initialization process. Upon receiving the overlay instructions, the client device may store the overlay instructions in a library located in a memory of the client device. Since the overlay instructions can be received prior to playback of video content, bandwidth may be conserved, reducing the likelihood of visual artifacts as a result of overlay generation by the client device during video playback.

As the user's viewing context changes, the client device may notify the server system of these changes. For example, the client device can send a message (e.g., request) to the server system that includes parameters such as client identifier (e.g., MAC address, IP address, Device ID, or User ID), as well as information pertaining to the video content being viewed at the client device. This information can include, for example, a channel identifier (ID), a feed ID, a playlist ID, a content item ID that identifies a particular video content item (e.g., movie or television episode), and/or device characteristics (e.g., brand, model ID, bandwidth, etc.). A playlist ID may identify a playlist identifying two or more video content items. The playlist may include a set of video content items and may indicate an order in which the video content items are to be played.

In some implementations, the information transmitted to the server system can further include or otherwise indicate state information (e.g., session information) such as a total time watched of the current video content, a percentage of video items in a playlist that have been played, a template identifier of a template for which an overlay is currently rendered, and/or a location of the client device.

In some implementations, a server system may analyze system data to dynamically generate and transmit customized instructions including overlay information to the client device that can guide the dynamic generation of overlay GUIs at the client device. The server system may generate overlay information for the client device responsive to a request from the client device or other event detected by the server system. Overlay information may be generated for the client device based, at least in part, on information such as a request received from the client device, a user profile associated with a user of the client device, and/or an event detected by the server system such as a breaking news story or national emergency. In some implementations, the server system generates customized overlay information that is suitable for the client device based, at least in part, on characteristics of the video content being rendered at the client device. In addition, the overlay information may be customized based, at least in part, on characteristics of a user of the client device. The server system may then instruct the client device to dynamically generate an overlay using the overlay information. In this manner, overlays may be customized within a video streaming context in real-time on a per-client or per-user basis.

The overlay information can include or identify overlay instructions (e.g., overlay templates) that are suitable for the client device. In addition, the overlay information can include overlay data that is pertinent to the overlay instructions. The overlay data can include, for a given template, data values that may be rendered using the template. In some instances, the overlay data can include data values that are mapped to variables of the overlay instructions.

In some implementations, the customization of overlay information is facilitated through the execution of machine learning processes. More particularly, machine learning algorithms may be implemented to generate machine learning models that can be applied, in real-time, to identify suitable overlay templates and/or overlay data.

Since the client device has been initialized with an initial set of templates, the server system need not send an overlay template in conjunction with overlay data in most instances. This is advantageous since the number and size of messages transmitted to a client device during playback of a video can be reduced. However, in some instances, the server may identify overlay template(s) that the server has not previously transmitted to the client device. In this instance, the server system sends the identified overlay template(s) to the client device. The client device may store or cache the received overlay templates for processing.

As the user interacts with the client device, the client device may notify the server system of a change in viewing context. In response to the notification or an independent request transmitted to the server system, the client device receives overlay information from the server system. For example, the client device may receive overlay data in conjunction with an instruction to dynamically generate an overlay using an identified set of templates and the server-provided overlay data. The client device may render one or more overlays using the set of templates and the overlay data. Because overlay templates are reusable, they may be used an unlimited number of times to efficiently generate overlays using overlay data received from the server system.

Each overlay template includes a set of computer-readable instructions configured to facilitate the rendering of a corresponding overlay including a graphical user interface (GUI). An overlay template may define a "layout" that may be used to generate an overlay. For example, a layout may include variables and/or values that indicate or specify display data such as position(s) (e.g., pixel coordinates), dimension(s), opacity, font type, font size, and/or color(s) to be used to generate an overlay or elements thereof. In some implementations, display data such as locations and/or dimensions may be represented in an overlay template by parameters/variables.

An overlay template and/or associated overlay data may define the location, within a display, at which a corresponding overlay or elements thereof are to be rendered. Similarly, an overlay template and/or associated overlay data may define the dimensions with which an overlay or elements thereof are to be displayed. For example, for an overlay template that includes a plurality of elements, pixel coordinates may define a location within an interface at which a corresponding element (e.g., field) or associated data is to be rendered within an overlay, as well as the dimensions with which the element or associated data is to be represented.

In some implementations, an overlay template may be configurable to provide an overlay with which a user can interact. This is superior to conventional read-only unidirectional overlays. An interactive overlay may include one or more template-specific interactive UI components that may each be defined within the overlay template via a corresponding interactive UI component definition. The definition may identify an action to be performed responsive to user interaction with the UI component. In some instances, the action may correspond, at least in part, to a set of computer-readable instructions of the overlay engine. Examples of such user UI components include, but are not limited to, buttons and menus. Since a user may interact with a UI component of an overlay that would initiate a transmission of information to the server system, the server system may use this information to customize further overlays for the user throughout their video viewing experience, or to create multi-step navigational flows. Therefore, overlays that are generated may support one-to-one bi-directional communication between a client device and the server system.

In some implementations, an overlay may be generated such that it is synchronized with video content rendered by a video player operating on the client device. More particularly, overlays may be coordinated and positioned so as to avoid obstructing or interrupting video content rendered by the client device. Therefore, the disclosed implementations may facilitate the coordination of overlays with video content that is transmitted separately from overlay information that guides the dynamic generation of the overlays.

The video content may be received and/or requested from the server system. Video content can include, for example, a particular video content item, a channel (e.g., television channel or data stream), and/or a video playlist, which may indicate an order in which multiple video content items are to be played. A video content item may be a video content item within a playlist. For example, the video content item may be currently playing or may be a next video content item in the playlist. The video content may include live or on-demand content.

A server system may synchronize the presentation of overlays with streaming video content rendered within the same display, at least in part, through the use of template-specific triggers. In some implementations, an overlay template includes or identifies a set of template-specific triggers, which may be interpreted by an overlay engine as described herein. A trigger can identify, for example, an event that, upon detection, governs whether an overlay is generated (or hidden) and/or that controls the timing with which the overlay is generated (or hidden). As another example, a trigger can identify an event that, upon detection, controls the change in position and/or dimensions of a portion of a display in which the overlay or video content is rendered. A trigger can identify one or more events such as user-initiated events and/or events that are detectable by a client device. Examples of template-specific triggers include, but are not limited to, full screen (e.g., the video content is rendered in full screen), end full screen (e.g., the video content is not rendered in full screen), start ad (e.g., the start of an ad within the video content or independent from the video content), end ad (e.g., the end of an ad within the video content or independent from the video content), start video, end video, start channel (e.g., pertaining generally to a request to access a channel or pertaining to a request to watch a specific channel), switch channel (e.g., a request to switch to another channel that either general or specific to a particular channel), start video playlist (e.g., identifying a particular playlist), switch playlist (e.g., identifying a particular playlist), a skip video event (e.g., skipping to a next video in a video playlist), rendering of another overlay, rendering of video player controls (e.g., pause, stop, rewind, fast forward), and/or specific user actions. User actions can include, for example, pause, play, fast forward, rewind, a show overlay request, or a hide overlay request. Such user actions may include a user interaction with a corresponding UI component or interaction with an input device (e.g., via a remote control or voice command).

In some implementations, a video player may be instructed to render video content in a manner that accommodates dynamically generated overlays. This may be accomplished, for example, by specifying a second portion of the display in which video content is to be rendered. Such instructions may be transmitted in overlay information via the specification of a position and/or dimensions of this second portion. In some implementations, an overlay template may include variables and/or triggers that correspond to the position and/or dimensions of the second portion of the display at which the video content is to be rendered. During the streaming of video content, the position and/or dimensions of the second portion of the display containing the video content may be customized in real-time for an optimal viewing experience.

In some implementations, an overlay template may define a set of timing information in association with the template and/or one or more elements of the template. The set of timing information may control the timing with which an overlay and/or elements thereof are rendered or generated. A set of timing information can include timing parameter(s)/variable(s) and/or static timing values. Overlay data received by the client device can include timing value(s) corresponding to the timing parameter(s). Examples of timing parameters include, but are not limited to, a delay time period, a duration, a start time, and an end time. The transition of an overlay or elements thereof into and out of a display or within an overlay may similarly be controlled through the use of corresponding designators, variables, and/or values within an overlay template.

Any of the above features may be implemented alone or in combination with one another. In some instances, within a template, an element may include an interactive UI element having associated timing information and display data. As one example, overlay elements within a stock ticker overlay may be rotated via the use of timing information. In this manner, a template may facilitate the "animation" of overlays or elements therein.

The disclosed implementations may be implemented using a variety of communication protocols and technologies. In some implementations, messages are transmitted between a server system and client devices via a network protocol such as TCP/IP. In other implementations, messages are transmitted between a server system and client devices using a version of the Advanced Television Systems Committee (ASTC) standards for television broadcasting such as ATSC 3.0.

FIG. 1 shows a diagram of an example of a computing environment 100 in which an overlay management system 102 may be implemented, in accordance with some implementations. System 102 transmits customized overlay information via network 104 to individual client devices (106-1 through 106-5) in accordance with the implementations described herein. System 102 may include one or more servers 103, each of which can include one or more processors 115 and memory. Network 104 can include a wide variety of network environments including, for example, TCP/IP-based networks, telecommunications networks, wireless networks, cable networks, satellite networks, wide area networks, local area networks, the Internet, etc. Client devices 106 may each be a device capable of connecting to network 104 and consuming overlay information such as overlay instructions and overlay data provided by system 102. Examples of such devices include, but are not limited to, mobile devices (e.g., smart phones and tablets), personal computers (e.g., laptops and desktops), set top boxes, and smart televisions.

In some implementations, system accesses a shared pool of computing resources (e.g., servers, storage) to identify, generate, and/or provide overlay templates and/or associated overlay data. Computer program instructions configured to facilitate the dynamic generation of overlays as described herein may be stored in any of a variety of programming languages and/or data formats.

System 102 may be implemented independent from content system(s) that provide video content. Alternatively, system 102 may be integrated with or include a content service that provides video content. Video content may include live or on-demand content.

System 102 may provide overlay information to client devices in conjunction with one or more networks 104, which may integral with or independent of a content service. In addition, the source(s) of the video content, overlay templates and/or overlay data may be independent of or integrated with system 102. Implementations are contemplated in which overlay instructions and/or overlay data may be transmitted by, obtained from, and/or manipulated by a service that is integrated with system 102, by a service associated with a content provider, or a third-party service. Example third-party services include, but are not limited to, a calendar application, a weather service, a news service, an emergency alert service, and a financial service. Communication with a third-party service may be facilitated via a corresponding application programming interface (API).

System 102 includes device configuration logic 126 that facilitates the initialization of client devices 106 with a library of overlay templates as enabled by the present disclosure. Initialization can include transmission of a plurality of overlay templates to client devices 106. In some implementations, an initial set of overlay templates is customized on a per-client basis. Each template may be associated with a template identifier. In addition, a template may be associated with a corresponding set of template characteristics that can indicate, for example, a context in which the template is to be used to render an overlay. For example, template characteristics can include tags such as news, stocks, or urgent.

System 102 may track templates that are transmitted to individual client devices. By maintaining a list of templates that have been sent to an individual client device, system 102 may easily ascertain whether to transmit a template to the client device at a later time. Alternatively, system 102 may rely on client devices to request templates.

In addition, system 102 includes overlay customization logic 128 that facilitates the customization of overlay information for transmission to individual client devices 106. Overlay customization logic 128 facilitates the customization and transmission of overlay information including overlay data for specific overlay template(s) to individual client devices 106. Specifically, overlay customization logic 128 may identify overlay template(s) suitable for a client device based upon information such as a client request, a corresponding user profile, template characteristics, and/or events detected by system 102. In addition, overlay customization logic 128 may customize overlay data for an identified overlay template based, at least in part, on fields of the overlay template, as well as information such as a client request, a corresponding user profile, and/or events detected by system 102. In some implementations, overlay template(s) and/or overlay data may be customized based, at least in part, on user profiles associated with users sharing a set of characteristics with a user of the client device.

In some instances, a client request may indicate the number of rotations that have been completed for elements of an overlay. For example, where an overlay includes a ticker that includes six elements (or six pages of elements), a single rotation may comprise the complete rotation of all six elements within the ticker. Customization logic 128 may select overlay data based, at least in part, on the number of rotations that have been completed. Thus, the overlay data transmitted to the client device for a second rotation may differ from that transmitted to the client device for the first rotation.

System 102 may also include machine learning logic 130 configured to facilitate the customization of overlay information on a per-client basis. The overlay information may identify a set of templates and/or an order in which templates in the set of templates are to be used to generate corresponding overlays.

Specifically, machine learning logic 130 may process information maintained in user profiles using machine learning algorithms to generate machine learning model(s) that can be applied to optimize the personalization of overlay templates. The information that is processed may be specific to a particular client device, user, and/or category of users (e.g., users sharing the same characteristics). For example, if a user has historically chosen not to interact with a particular template or type of template, system 102 may, at a later time, choose a different type of template in place of that template for generation of an overlay via the client device of the user. As another example, if a group of users having the same characteristics tends to choose a particular template, that template may be used to generate overlay information for a client device associated with a user in that group.

System 102 may also include a variety of information related to overlay template customization in data store(s) 112 of system 102. More particularly, data store(s) 112 can include a library of overlay templates. The library of overlay templates may include, for each overlay template, a template identifier and an associated set of template characteristics.

In some implementations, system 102 is configured to store user profiles/user accounts associated with users of system 102. Information maintained in a user profile of a user can include a client identifier such an Internet Protocol (IP) address or Media Access Control (MAC) address. In addition, the information can include a unique user or device identifier such as an alpha-numerical identifier, the user's name, a user email address, and credentials of the user. Credentials of the user can include a username and password or identity token. A user profile may also store information such as work location, home location, and/or current location.

In some implementations, a user profile includes device characteristics. Example device characteristics include, but are not limited to, device brand, device model, operating system, memory capabilities, and processor capabilities. The device characteristics may be obtained or derived based, at least in part, on one or more messages received from a client device of the user.

The information in a user profile can further include characteristics of the user. Characteristics of a user can include characteristics that are explicitly provided by the user and/or determined based upon historical information pertaining to the user's prior activities. Such activities may include, for example, interactions with overlays that have been generated via client devices of the user (or lack thereof) and/or video streaming history. Other activities can include interactions with applications (e.g., interactions with functions within a video application) or online activities (e.g., browsing, searching, and online purchases). Characteristics of a user can be derived from the historical information. For example, such characteristics can include characteristics of the content (e.g., content items, channels, feeds, playlists) that the user has interacted with or viewed and/or characteristics of overlays that the user has interacted with. The characteristics of the user can include, for example, preferences of the user such as content preferences of the user, product preferences of the user, template preferences, and/or application preferences of the user. Therefore, the profile may indicate the types of data that the user is interested in (or not interested in) and/or the types of overlays (e.g., overlay templates) that the user is interested (or not interested in).

The information in a user profile may also include an identifier of video content that a client device of the user is playing, has previously played, or has requested. The information may identify video content that system 102 transmitted to a client device of the user and/or an identifier of video content that the client device previously (e.g., recently) played. For example, the information in the user profile may identify a video content item, a channel, a feed, and/or a playlist identifying multiple videos. The playlist may indicate an order in which the videos are to be played.

System 102 may track a user's interaction with interactive overlays in a user profile. The system may record instances in which the user has interacted with an overlay, as well as instances in which the user has elected not to interact with an overlay. For example, the system may maintain, in a user profile, a log of such user interactions with time stamps of the interactions (or lack thereof). Examples of user interactions include a playback request, a pause request, and a skip request indicating a request to skip to the next video in a playlist. System 102 may analyze the log to determine a pattern of user interactions with overlays such as specific overlay types. Patterns may be detected, for example, based upon time of day or day of the week. For example, system 102 may determine that the user interacts with business overlays only during the hours of 8 am-9 am on Monday through Friday.

System 102 may apply a record of the user's interaction with an interactive overlay to determine whether to provide the overlay or another overlay. If a user has not interacted with an overlay, system 102 may choose to provide that overlay at a subsequent time. Alternatively, system 102 may interpret this lack of interaction as a lack of interest and mark that template as not relevant to that user.

System 102 may process user profile(s) associated with the user and/or other users (e.g., sharing characteristic(s) with the user) to generate statistics pertaining to overlay templates. For example, system 102 may analyze whether users have interacted with an overlay corresponding to an overlay template. The results of such analysis may be recorded and used to generate overlay information, as described herein.

In some implementations, a user can configure overlay preferences, either via the system or via an application installed on their client device. For example, overlay preferences may be configured via an onboarding process or application settings. As another example, while viewing a video, the user may choose to provide feedback regarding an overlay that is rendered on their client device to instruct system 102 not to show that overlay again. These preferences can indicate the types of overlays the user wishes to receive and/or the types of overlays the user does not want to receive. In addition, the preferences can indicate the categories of content of which the user would like to be notified (e.g., via a news overlay or stock overlay), categories of content of which the user would not like to be notified, and/or a prioritization of categories of content in relation to one another. The content preferences may be associated with a particular type of overlay or may be general content preferences that are applicable to all overlay types.

In some implementations, a user may configure their user profile with their username and password associated with third-party service(s) such as a calendar application or financial application. In this manner, the user may give system 102 the permission to access their information (e.g., calendar) and/or account to provide suitable overlays during the user's video streaming experiences.

Overlay information may be provided and/or hosted by one or more separate systems. While logic 126, 128, 130, and data store 112 are shown as integrated with system 102, it is important to note that this example is merely illustrative. In other implementations, one or more of logic 126, 128, 130 may operate remotely from system 102 and/or may operate under the control of an independent entity.

In some implementations, overlay GUIs may be dynamically generated, in real-time, by a client device implementing an overlay engine configured to interpret overlay instructions configured at the client device. The overlay GUIs may be generated using overlay information received in real-time from a server system. Example implementations of a client device and overlay engine will be described in further detail below.

Figure 2:
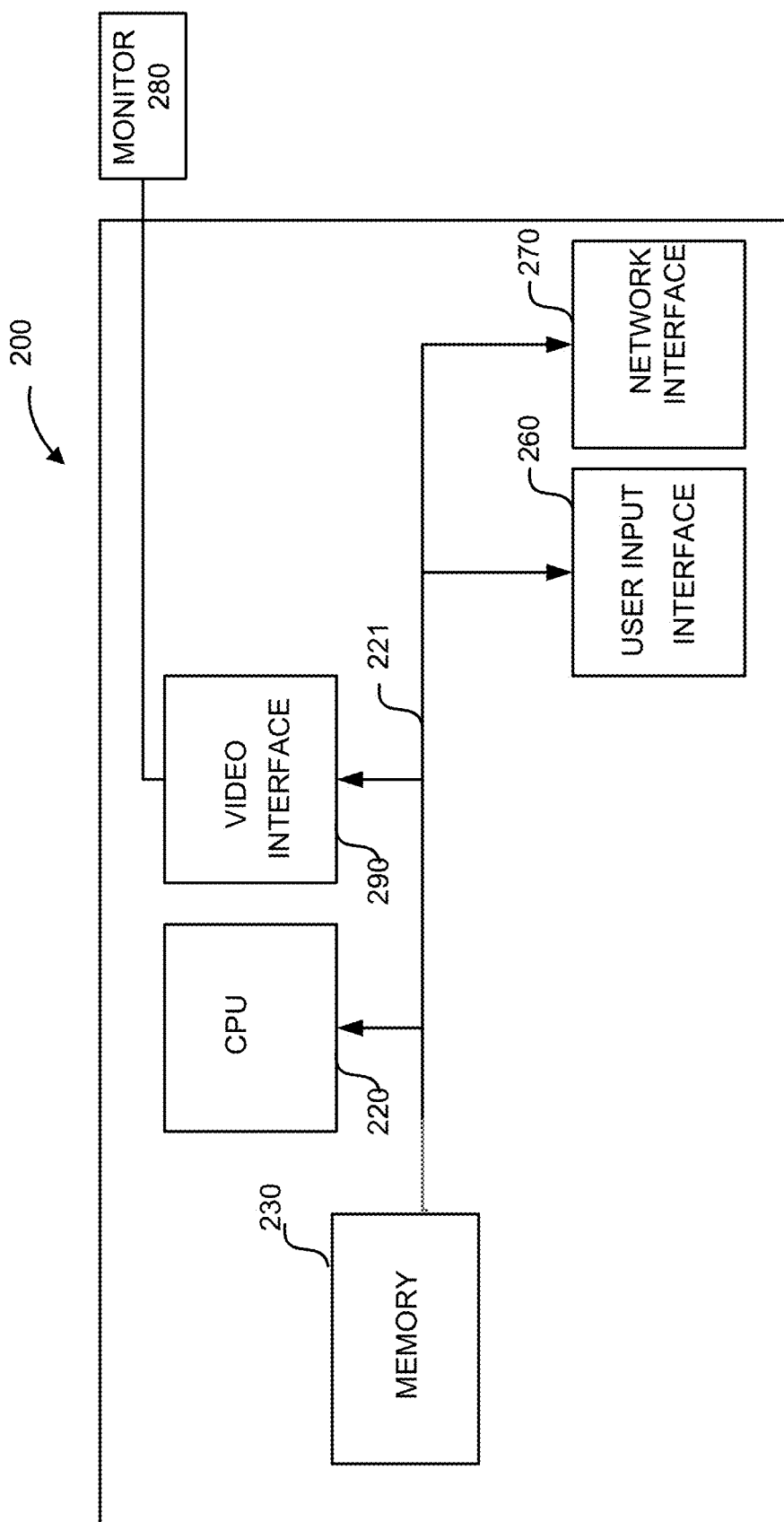
FIG. 2 shows a diagram of an example computing system 200 that may be used with some implementations.

FIG. 2 is a diagram of an example computing system 200 that may be used with some implementations. The computing system 200 may include a central processing unit (CPU) 220 having one or more processing cores and a memory 230. In some implementations, computing system 200 includes a system bus 221 that couples with various system components including the memory 230 to the CPU 220.

The computing system 200 can include a variety of computer program product, which may be configured to execute an overlay engine that operates as described herein. A computer program product can be any available media that can be accessed by computing system 200 including, but not limited to, volatile and nonvolatile media, removable and non-removable media. A computer program product may store information such as computer readable instructions, data structures, or other data such as that described herein.

Memory 230 may include read only memory (ROM)) and random-access memory (RAM). The computing system 200 may also include other removable/non-removable volatile/nonvolatile computer storage media.

In some implementations, memory 230 stores computer readable instructions, data structures, and/or data, which may include overlay templates and/or overlay data received from a server system such as that described above with reference to FIG. 1.

A user may interact with the computing system 200 through an input device such as a keyboard, a microphone, a remote control, and/or a pointing device such as a mouse, touch pad, or touch screen. These and other input devices may be connected to the CPU 220 through a user input interface 260. Alternatively, an input device may be connected to computing system 200 by another interface such as a universal serial bus (USB) port or wireless interface. A monitor 280 or other type of display device may be connected to the system bus 221 via an interface, such as a video interface 290. In addition to the monitor, system 200 may also include other output devices such as speakers.

The computing system 200 may operate in a networked environment via which it may connect to a server system such as that described above with reference to FIG. 1. The computing system 200 may be connected to a local or wide area network through a network interface or adapter 270.

Figure 3:
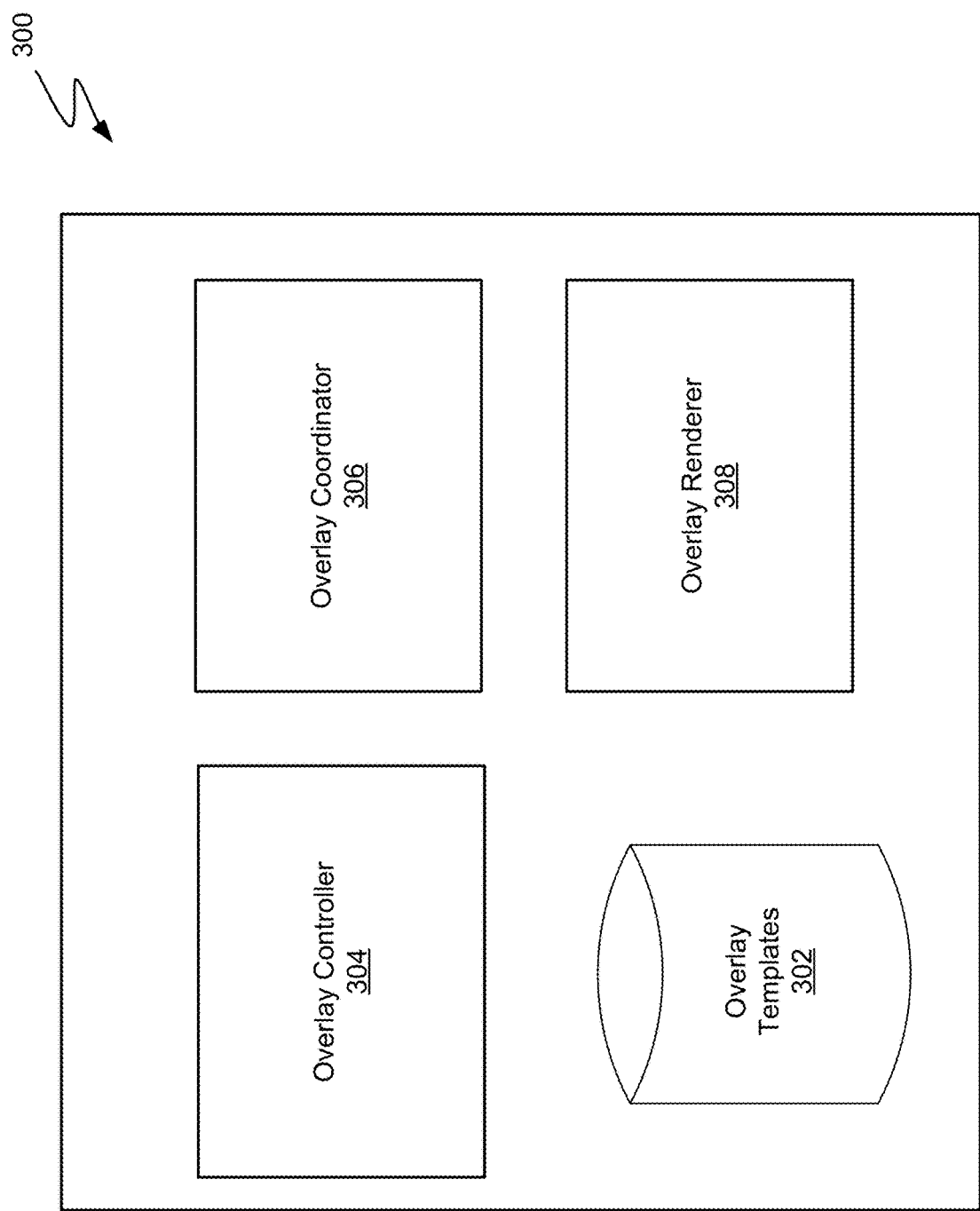
FIG. 3 shows a block diagram of an example computing system 300 that may be implemented, in accordance with some implementations.

FIG. 3 shows a block diagram of an example computing system 300 that may be implemented, in accordance with some implementations. Computing system 300 can maintain a library of overlay templates 302 that have been received from system 100. The library of overlay templates 302 may be updated as additional overlay templates are obtained from the server system.

An overlay engine may be implemented by one or more components. In this example, the overlay engine is implemented by an overlay controller 304, an overlay coordinator 306, and an overlay renderer 308.

Overlay controller 304 is configured to communicate with system 100 to obtain overlay templates and overlay data, as will be described in further detail below. Overlay controller 304 maintains the library of overlay templates 302 as overlay templates are received from system 100. In some implementations, overlay controller 304 is configured to determine which overlay templates are to be applied, either based upon a communication received from system 100 or responsive to a trigger detected by overlay controller 304.

Overlay controller 304 may communicate with overlay coordinator 306, which manages the timing or triggering of the presentation of overlays. For example, overlay coordinator 306 may manage the transitions to and between overlays, as well as the timing of the transitions. A transition may include, for example, animation such as rotating, fading in, fading out, sliding in, or sliding out. Each such transition may be defined, at least in part, within a corresponding template. For example, a transition time or corresponding variable may define the duration of a transition.

In some implementations, an overlay renderer 308 is configured to manage the rendering of elements within an overlay. For example, overlay renderer 308 may manage the rotation of user elements within a stock overlay. Elements that are presented (e.g., rotated) within an overlay may also be referred to as pages.

Overlay templates may be implemented in a hierarchical manner. More particularly, an overlay hierarchy may indicate a relationship among templates in the hierarchy. For example, the overlay hierarchy may indicate an order in which overlays corresponding to the templates are to be rendered. A hierarchy may be implemented via a linked list, tree data structure, or other form of hierarchical representation.

Elements within an overlay template may similarly be represented in a hierarchical manner. This may be accomplished, for example, via element or page templates. An overlay template may reference one or more element or page templates.

To illustrate the operation of the disclosed implementations, several example use cases will be described below. These examples show example overlays that may be generated, as well as demonstrate the respective interactions between a client device and server system that facilitate the generation of the overlays within the context of a video streaming system.

Figure 4A:
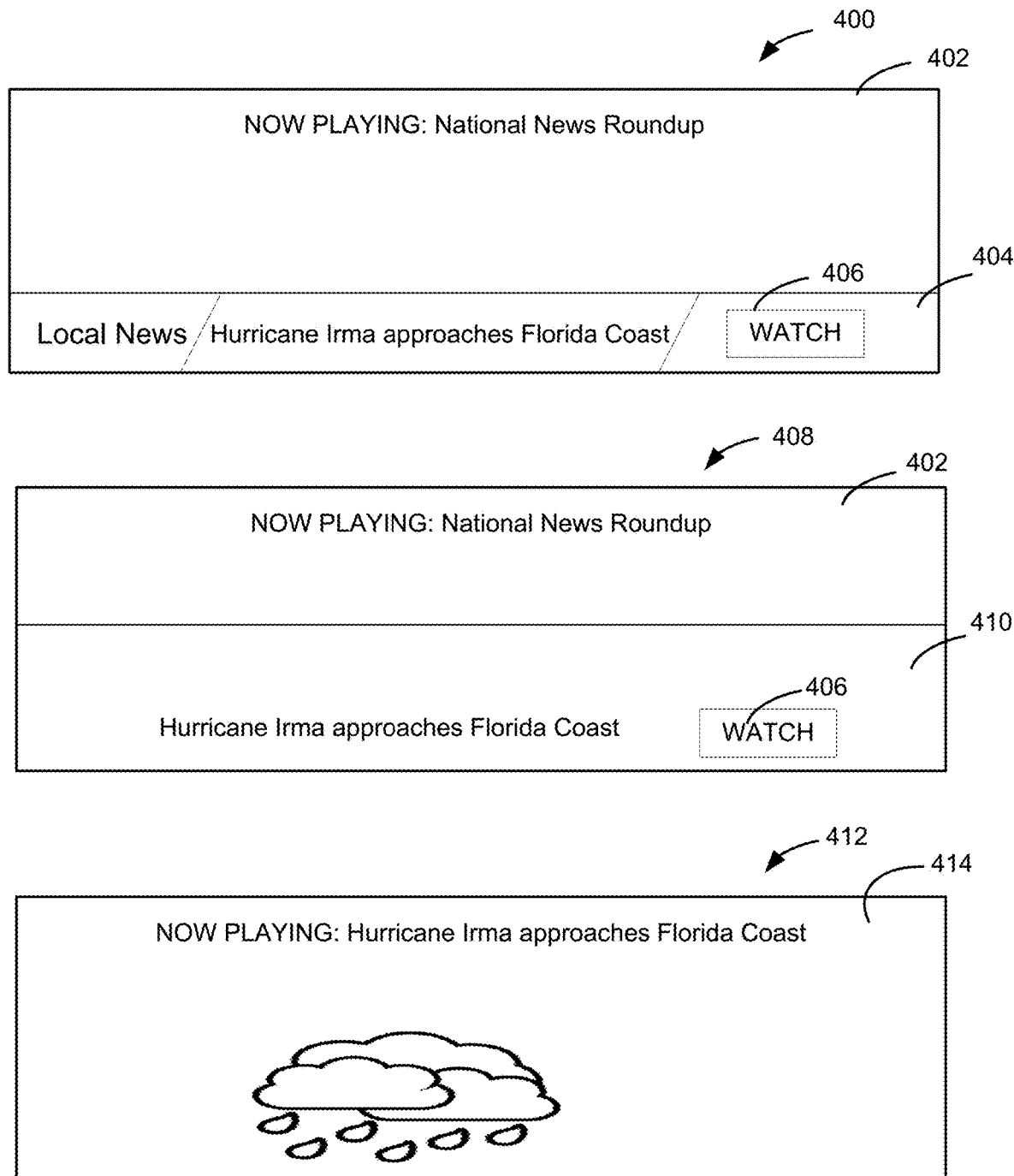
FIG. 4A shows an example of a use case in which an overlay including an interactive user interface (UI) component may be dynamically generated within the context of a video streaming environment, in accordance with some implementations.

FIG. 4A shows an example of a use case in which an overlay including an interactive user interface (UI) component may be dynamically generated within the context of a video streaming environment, in accordance with some implementations. In this example, a user is viewing a news program 402 on a display 400 of a client device. When the user switches the channel to the view the news program, the client device notifies the server system of the channel via which the user is watching the news program. In response, the server system transmits overlay data to the client device, where the overlay data includes an identifier of a news template and includes data values that can be rendered within a news overlay generated using the news template. The client device retrieves the news template, interprets the overlay data, and dynamically generates a corresponding news overlay 404 that presents the data values. In this example, overlay 404 includes a UI component 406 (e.g., button) with which the user can interact to view a local news story identified in overlay.

The user may choose to expand the overlay 400, for example, to view further information. After the user requests expansion of overlay 400 by interacting with overlay 400, the display is updated, as shown at 408. More particularly, overlay 404 is expanded such that an expanded overlay 410 is rendered. For example, the news template may include a UI component definition that defines the action (e.g., expansion) to be performed responsive to interaction with a corresponding UI component of overlay 400.

The user interacts with UI component 406 to watch the local news story. In this example, the news template includes a UI component definition that defines the action (e.g., calling a corresponding URL or command) to be performed when the user interacts with UI component 406. As shown at 414, the overlay is further expanded to play a local news story, which may be identified in the template or data received from the server system.

Figure 4B:
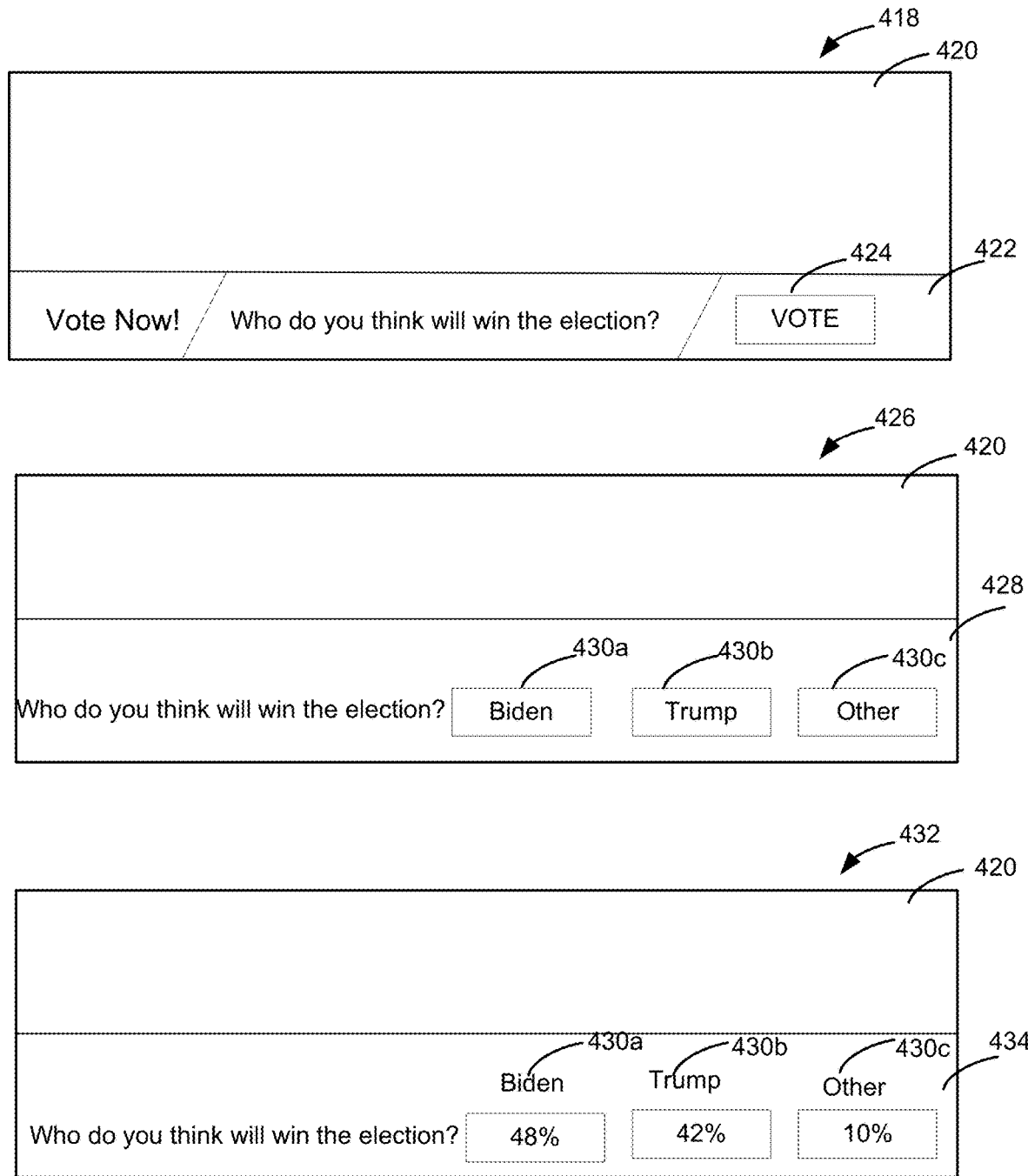
FIG. 4B shows an example of a use case in which an overlay including interactive UI components may be dynamically generated and implemented to gather information from a client device within the context of a video streaming environment, in accordance with some implementations.

FIG. 4B shows an example of a use case in which an overlay including interactive UI components may be dynamically generated and implemented to gather information from a client device within the context of a video streaming environment, in accordance with some implementations. In this example, the user is watching a live political debate on the news channel. The client device provides information pertaining to the user's viewing context to the server system and the server system identifies overlay template(s) suitable for the video content being streamed to the client device. Since the user is watching a live political debate, the server system selects an interactive polling template and transmits overlay information that identifies the polling template to the client device. For example, the overlay information may include overlay data that identifies the current presidential candidates, which may be represented by variables within the template.

As shown at 418, the display continues to show the video 420 that the user has been watching as the client device renders polling overlay 422 using the polling template and overlay data. The user then interacts with UI component 422 of overlay 422 so that they can submit their "vote." In this manner, a UI component definition within an overlay template facilitates the transmission of information submitted via a corresponding overlay 422 to a server system.

The display 426 continues to show the news program 420 while overlay 422 is expanded, as shown at 428. Expanded overlay 428 includes UI components 430a-c identifying corresponding candidates, where each corresponds to a UI component definition in a corresponding overlay template. The user selects their desired candidate by clicking on the corresponding UI component, which causes their vote to be transmitted to the server system. Since a user may cause information such as a vote to be transmitted to the system as a result of interacting with a UI component of an overlay such as overlay 428, that information may be processed by the system. More particularly, the system may update a user profile of the user based, at least in part, on the information and/or use the information to further customize overlays for the client device. Such customized overlays may include the current overlay or another overlay. As shown in this example, updated overlay 434 presenting voting statistics calculated by the system using the information (and further information received from other client devices) is presented via display 432. Therefore, an overlay template may be used to generate an interactive polling template within the context of a video streaming context.

Although the example of FIG. 4B pertains to voting, this example is merely illustrative. User input submitted via a UI component of an overlay can include, but is not limited to, a selection of a UI component, submission of text, and/or selection of a user-selectable option from a plurality of user-selectable options. In some implementations, user input may be submitted that indicates a mood of the user. In other implementations, a UI component may be configured to facilitate submission of a payment responsive to user interaction with the UI component.

Figure 4C:
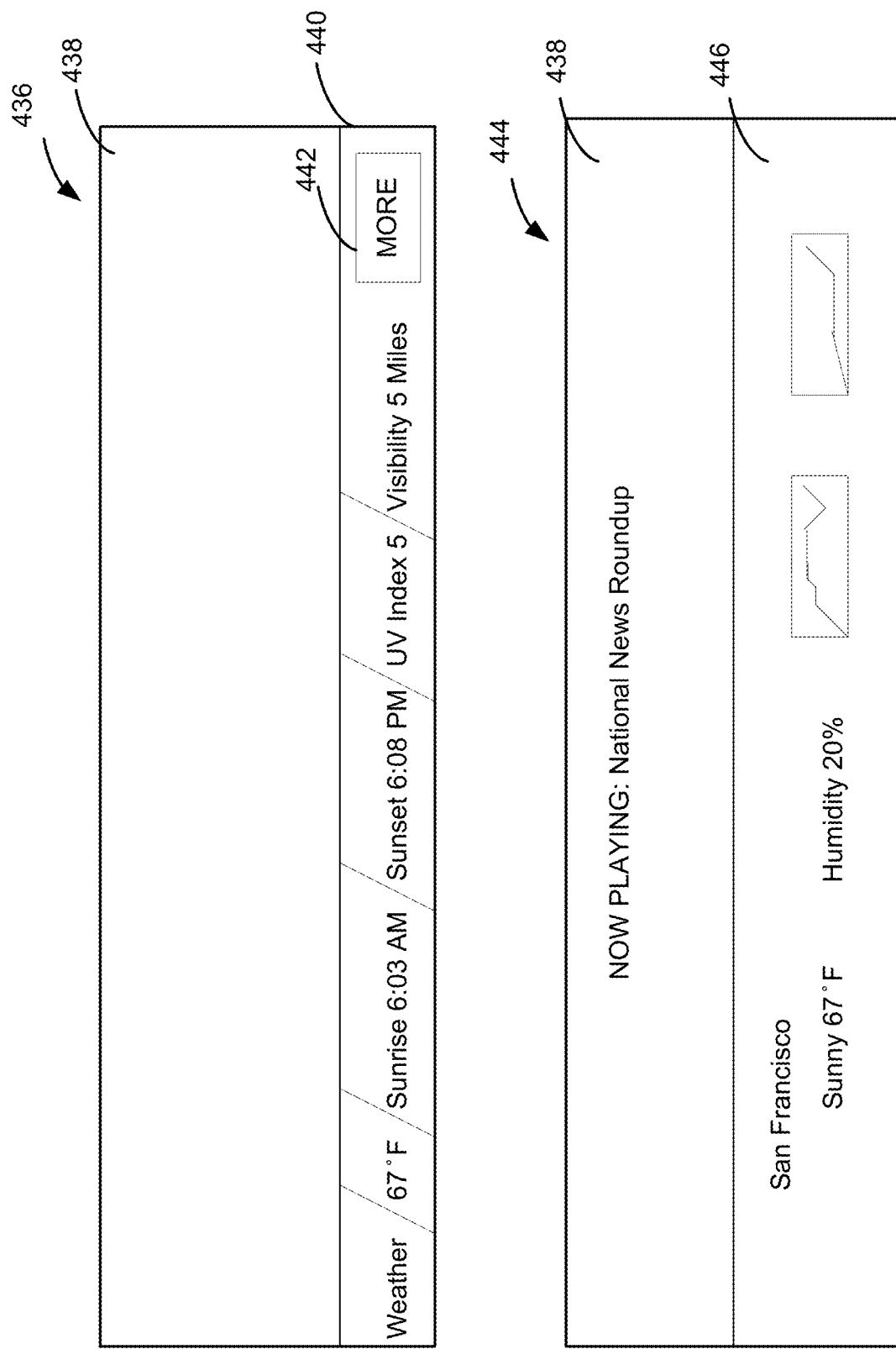
FIG. 4C shows an example of a use case in which an overlay may be dynamically generated to render an interactive weather ticker within the context of a video streaming environment, in accordance with some implementations.

FIG. 4C shows an example of a use case in which an overlay may be dynamically generated to render an interactive weather ticker within the context of a video streaming environment, in accordance with some implementations. In this example, a user is viewing a video 438 via display 436. The client device dynamically generates overlay 440 using overlay information received from the server system. In this example, overlay 440 includes a weather ticker in which elements may be rotated according to timing parameters/variable(s) identified in a corresponding weather ticker template. For example, the template may include instructions or guidelines that may be interpreted, in real-time, by the client device to generate or update the overlay. In some instances, the values associated with the timing parameters and/or fields of the template may be transmitted, in real-time, by the server system within overlay data to the client device. For example, the values corresponding to fields of the weather template may be determined based, at least in part, on a user profile indicating, for example, a location of the user. In this manner, the transition between rotating elements of an overlay may be defined within a corresponding overlay template.

When a user interacts with UI component 442, an expanded overlay 446 is rendered at 444, as defined by the ticker template. For example, the ticker template may define a UI component that indicates that a user interaction with UI component 442 causes an expanded overlay 446 to be rendered in which additional weather information is presented.

FIGS. 4D-4G show examples of overlay templates and associated overlay data that may be used to dynamically generate a ticker overlay such as that shown in FIG. 4C. In some implementations, elements defined within the template do not move (e.g., rotate) within the overlay that is generated. In other implementations, elements defined within the template may move (e.g., rotate) within the overlay.

A template may include one or more fields. A field of a template may have one or more corresponding values, which may be statically defined within the template or may be defined through the use of corresponding variable(s) or macros. During runtime, overlay data received by the client device may include value(s) that are mapped to parameters/variable(s) corresponding to fields within the template.

A layout may be generated using one or more overlay templates. Thus, a layout that visually appears to include a single GUI may include one or more separate layouts (e.g., GUIs).

As shown in FIG. 4D, a layout template 448 may correspond to a "main box" of the ticker. For example, the main box may exclude a weather portion of layout 440. Template 448 includes a field ("frame") for which values define a position and dimensions of the layout. While the values may be specified within template 448, the values may also be received in overlay data from a server system. In addition, the layout may include field(s) having associated timing parameters. Example timing parameters include, but are not limited to, a delay timing parameter, a duration timing parameter, and an interval timing parameter, as will be described in further detail below.

As shown in this example, the parameters can include a delay parameter for which a corresponding value specifies a delay time that the overlay engine is to wait before a transition or animation of overlay element(s) corresponding to the field(s) of the template is to be initiated (e.g., after a template-specific trigger or other event is detected). The parameters can further include a duration parameter for which a corresponding value specifies a duration over which a transition or animation of the overlay element(s) is to occur. In other words, the duration may govern the total time the overlay engine should apply to complete a transition or animation of the element(s) (e.g., from one position within the display to another position within the display). Thus, the duration and/or delay times may govern the transition in or a transition out of rendering element(s) of an overlay.

In some implementations, the timing parameters include an interval timing parameter for which a corresponding value specifies a time for which the element(s) are to be rendered (e.g., upon completion of the transition or animation). Upon expiration of the interval time, the overlay engine may remove or hide the element(s) or associated value(s) from the display and/or move the element(s) or associated value(s) to another location within the display, as instructed by the corresponding template(s). Potential positions at which elements may be rendered (e.g., rotated) within an overlay may be designated by positions of fields within the template 448. Therefore, a duration, delay, and/or interval timing parameter may guide a rotation of elements within the display.

Within template 448, a first set of triggers (e.g., start_fullscreen, end_ad) and/or timing parameters may be defined in association with a transition into rendering the corresponding overlay, while a second set of triggers (e.g., end_fullscreen, start ad) and/or timing parameters may be defined in association with transitioning out of rendering the overlay. In this example, the ticker is presented when a full screen is detected or an ad ends, while the ticker is removed when an ad starts or the end of a full screen is detected. The ticker is presented by way of the "ticker_up" transition (defined in a separate part of the set of templates). Specifically, the ticker_up transition may dictate that the ticker is to be rendered (put up). As shown in FIG. 4D, the transition is run for 500 units (e.g., milliseconds) with zero delay, after which point the ticker is then shown on screen. When the outro transition is triggered, the ticker is removed by way of the "ticker_down" transition (similarly defined in a separate part of the set of templates). The ticker_down transition may dictate that the ticker is to be removed (taken down). In this example, the transition is run for 2000 milliseconds with a delay of 1300 after the detection of a trigger in the second set of triggers, resulting in the ticker being removed at the end of the transition.

As shown in FIG. 4E, a second layout template 450 may be associated with a weather portion of layout 440. Template 450 defines the format (e.g., position and dimensions) and appearance (e.g., color) of the weather portion of layout 440. In addition, parameters associated with a transition into and/or out of rendering the weather portion of layout 440 may be defined.

Overlay templates may be hierarchical. FIG. 4F shows an example of a child template 452 of template 450. In this example, child template 452 is configured to render values associated with variables/parameters corresponding to elements (e.g., fields) of the weather portion of layout 440. More particularly, template 450 may define a format (e.g., position and dimensions) associated with an element/field in which a corresponding value is to be rendered. In addition, template 450 may define the appearance (e.g., color, opacity, font value) associated with the element. A template such as template 450 may, for a field of template 450, define a type of data that is expected for the field.

FIG. 4G shows an example overlay data 454 that may be transmitted in association with the weather portion of overlay 440. In this example, overlay data 454 corresponds to template 450 and its child template 452. More particularly, for each field/element of template 450 and child template 452, overlay data 454 provides a value for a corresponding parameter/variable. In this example, overlay data 454 includes the values "Weather," "67° F.," "Sunrise," "6:03," and "AM". Therefore, overlay data 454 may include hierarchical data associated with a set of hierarchical templates.

Figure 4H:
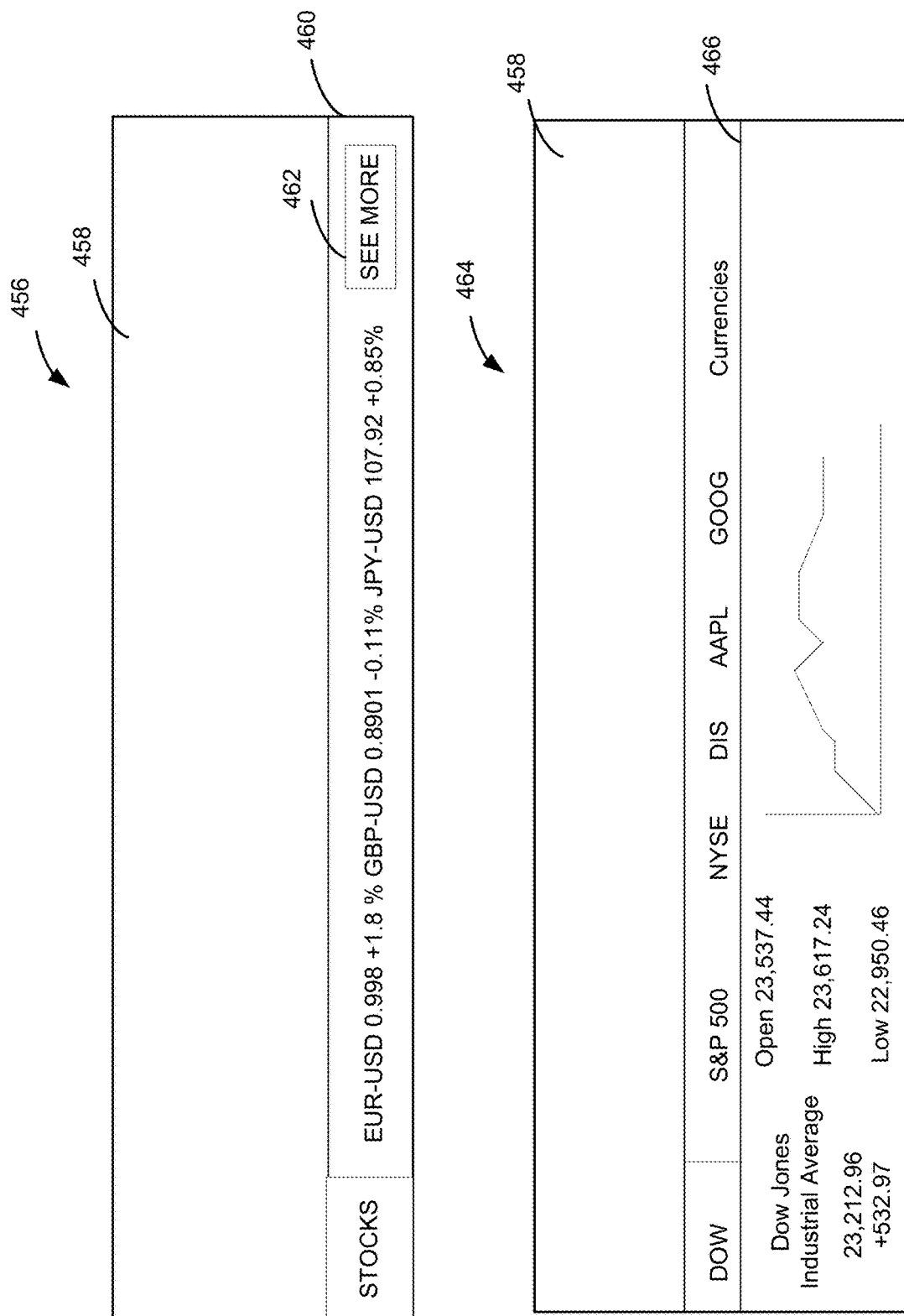
FIG. 4H shows an example of a use case in which an overlay may be dynamically generated to render an interactive stock ticker within the context of a video streaming environment, in accordance with some implementations.

FIG. 4H shows an example of a use case in which an overlay may be dynamically generated to render an interactive stock ticker within the context of a video streaming environment, in accordance with some implementations. A user may watch a streaming video 458 on display 456. While switching to the channel or while watching the video, the client device receives overlay data from the server system, where the overlay data identifies overlay template(s) configured to render a stock ticker and associated overlay data. The client device dynamically generates a stock ticker overlay 460 using the identified template(s) and overlay data. More particularly, the overlay template(s) are configured to render interactive UI component 462. The user clicks on UI component 462, which causes overlay 460 to expand to generate expanded overlay 466 on their display, as shown at 464.

Figure 4J:

FIGS. 4I-4K show examples of overlay templates and associated overlay data that may be used to dynamically generate a ticker such as that shown in FIG. 4H. As shown in this example, overlay data 468 identifies a plurality of variables/parameters for which values may be rendered using an overlay template such as the one used to render overlay 460 of FIG. 4H.

As shown in this example, overlay data such as overlay data 468 can further include a URL that is associated with UI component 462 of overlay 460. In this example, overlay data 468 includes a "bottom_extended_params" parameter that has an associated URL value. The value of the URL may be statically defined within the template or may be transmitted in overlay data by the server system, enabling the URL to be customized for the client device.

When the user clicks on UI component 462 of overlay 460, the client device recognizes that this UI component 462 is associated with parameter "bottom_extended_params." The client device calls the URL, which causes the server system to transmit additional overlay data identifying an extended overlay template and including corresponding values to the client device. The client device then renders the extended overlay using the extended overlay template and associated values it has received.

In accordance with various implementations, a UI component may be in a focused, unfocused state, or selected state The state of an element such as a UI component may change responsive to a user interaction with the UI component. The definition of the UI component and/or the overlay data may include value(s) associated with the state. For example, the value(s) may correspond to variable(s) such as color, brightness, and/or opacity. In some instances, the state of an element may be updated responsive to an event such as a template-specific trigger event. For example, the state of an element may be updated responsive to a change in context (e.g., a change in channel), a video event (e.g., start, stop, pause), or other information pertaining to video content rendered by the client device such characteristics of the video content. Characteristics of the video content may include or be derived from tags assigned to the video content or other metadata associated with the video content. For example, the tags may include a category such as comedy, horror, etc.

FIG. 4J shows an example of overlay data 470 that may be received responsive to calling the URL of FIG. 4I. More particularly, overlay data 470 may identify one or more templates configured to generate an expanded overlay and, for each of the identified templates, corresponding parameter value(s). For example, parameter values may include "DOW," "S&P 500," "DOW," etc. corresponding to fields of the templates. Overlay data 470 may also indicate a position of each field/element for which data is to be rendered within the expanded overlay 466. The client device generates expanded overlay 466 of FIG. 4H using the overlay data such that the parameter values are shown at corresponding elements/portions of expanded overlay 466 of FIG. 4H.

As shown in FIG. 4K, overlay template 472 may indicate timing parameter value(s) associated with a transition into and out of expanded overlay 466. Upon transitioning out of expanded overlay 466, the overlay is no longer rendered. Overlay template 472 may similarly indicate parameter values associated with elements to be rendered within the expanded overlay 466. For example, the values may indicate timing parameter values associated with transitions into and out of elements within expanded overlay 466, as well as indicate placement (e.g., position and dimensions) and formatting (e.g., color) of elements within the overlay. For example, the values may indicate a distance between elements of expanded overlay 466 and/or a time (e.g., interval) that the elements are rendered each time they are rotated. In addition, a transition time may indicate a time over which the elements are rotated, either for a single rotation or in total. In this manner, overlay template 472 may facilitate the rotating of elements (e.g., pages) within an overlay such as expanded overlay 466.

Figure 4L:
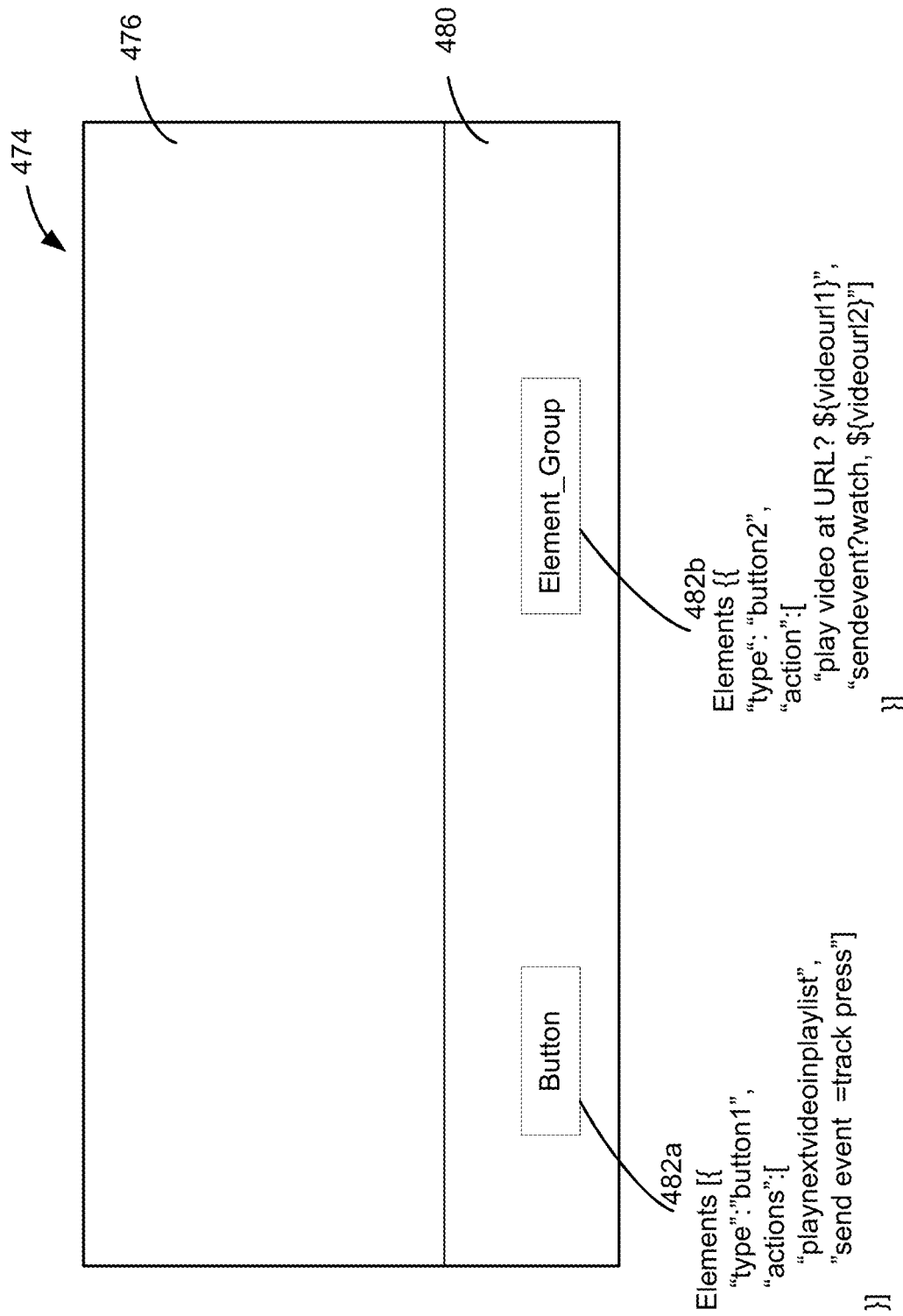
FIG. 4L shows an example of an overlay that may be dynamically generated to render interactive UI components within the context of a video streaming environment, in accordance with some implementations.

FIG. 4L shows an example of an overlay that may be dynamically generated to render interactive UI components within the context of a video streaming environment, in accordance with some implementations. As shown in this example, a display 474 may render a streaming video 476 and an overlay 480. Overlay can include UI components such as buttons 482a, 482b. Each UI component may be defined within a corresponding overlay template. As shown in this example, a UI component such as a button may be defined as an element having a corresponding element type (e.g., "button" or "element_group"). The element type or a corresponding label may be rendered in overlay 480 to identify the corresponding UI component or its purpose. The element definition may further identify action(s) to be performed by an overlay engine responsive to user interaction with the UI component. For example, the action(s) can include a sequence of identified actions that are triggered responsive to user interaction with the UI component. As shown at 482, the actions can include playing a video such as playing a next video in a playlist (as shown at 482a) or playing a video via a specific URL (as shown at 482b). Furthermore, an element defined within an overlay template may identify further action(s) such as sending an event to the server system for tracking responsive to interaction with a UI component of a corresponding overlay. For example, the event may notify the server of the user's interaction (e.g., selection of button 482a or 482b). In some implementations, the action(s) include firing a pixel. Other actions may include, but are not limited to, providing a menu, providing settings options, requesting that the user login to a user account, triggering the intro transition for another overlay, fetching overlay data for a subsequent overlay, submitting a payment request, and/or providing a search interface or other GUI, In some implementations, the use of tracking as defined within an element definition of an overlay template may be advantageously used to track a user's interest in an overlay or content thereof that is rendered. In some instances, tracking may be used in conjunction with soliciting user feedback regarding their interest in the overlay. The server system may update information in a user profile based, at least in part, on events captured as a result of the tracking.

In some implementations, a URL may be represented, within an overlay template, by a parameter or variable for which a value is transmitted in overlay data by the server system. In other words, the parameter may operate as a macro variable that is dynamically replaced on a per-client basis. For example, a parameter may identify a GUI or video that is to be rendered by the client device. In this manner, a value of a parameter such as a URL parameter of an overlay template may be defined to optimize a user's viewing experience.

Figure 4M:
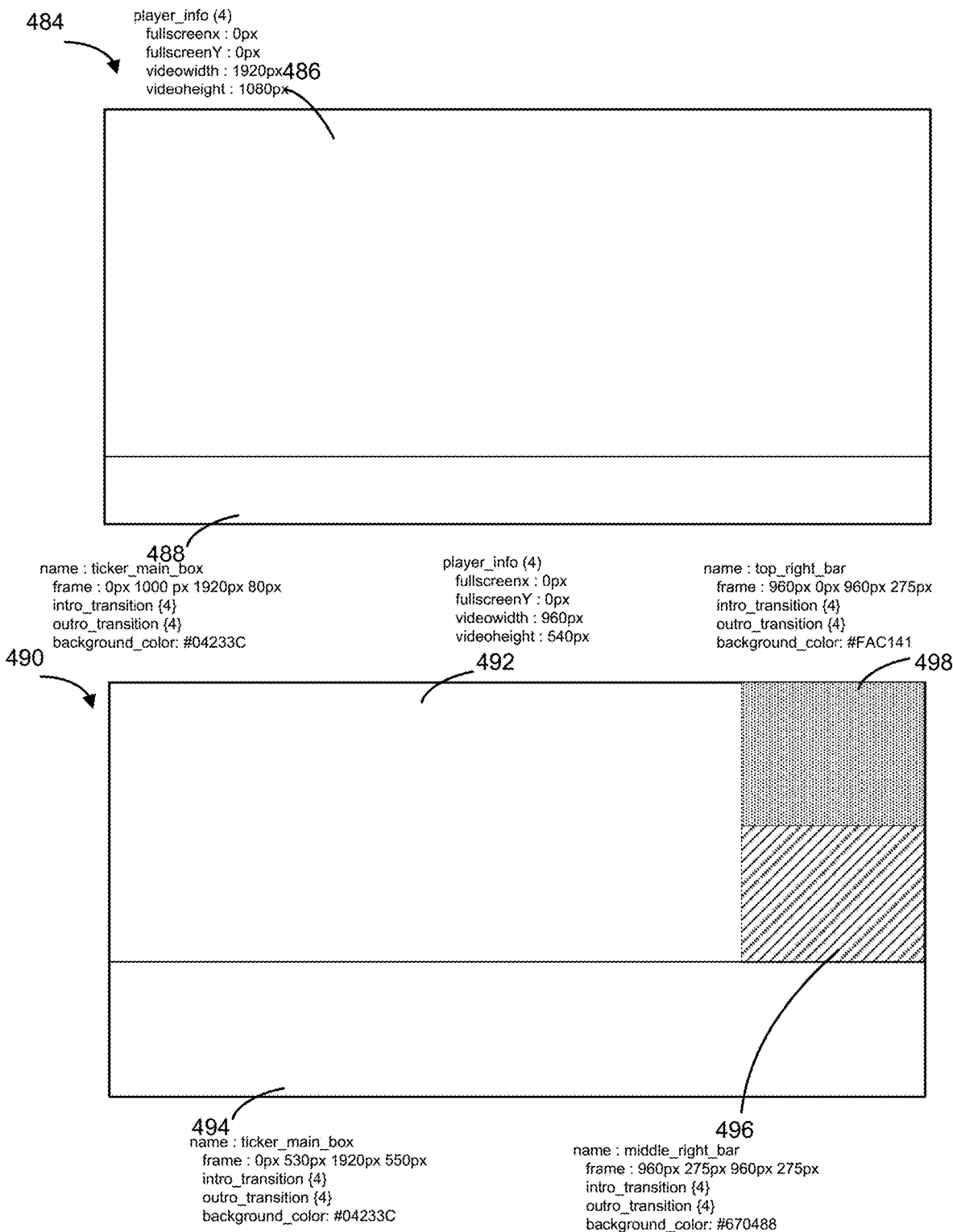
FIG. 4M shows an example of display on which overlays are dynamically generated and expanded within the context of a video streaming environment, in accordance with some implementations.

FIG. 4M shows an example of overlays that may be dynamically generated and expanded within the context of a video streaming environment, in accordance with some implementations. In this example, the portion of a display 484 in which the streaming video is rendered may be defined explicitly or implicitly in the overlay data and/or overlay template(s), as shown at 486. Specifically, the position and the dimensions of the portion of display 484 that shows the video may be defined in the template and/or associated overlay data. For example, for overlay (e.g., ticker) 488, the overlay data may identify a template name and pixel values associated with the template (e.g., position and dimensions associated with the overlay). The overlay data may further identify a background color of the overlay in association with a corresponding background color parameter of the template. In some instances, the overlay data may include parameter values associated with each timing value corresponding to a transition into and transition out of the overlay.

Display 490 shows that the video is shown in a smaller portion 492 of display 490. The size and/or dimensions of portion 492 may be received by the client device in overlay data received from the server system and/or may be specified in a corresponding overlay template in association with a template-specific trigger. Remaining portions of display 490 show overlays 494, 496, 498. Each of overlays 494, 496, 498 corresponds to overlay data that identifies the corresponding template name, location and dimensions, transition times, and background color, as shown in FIG. 4M.

Figure 5:
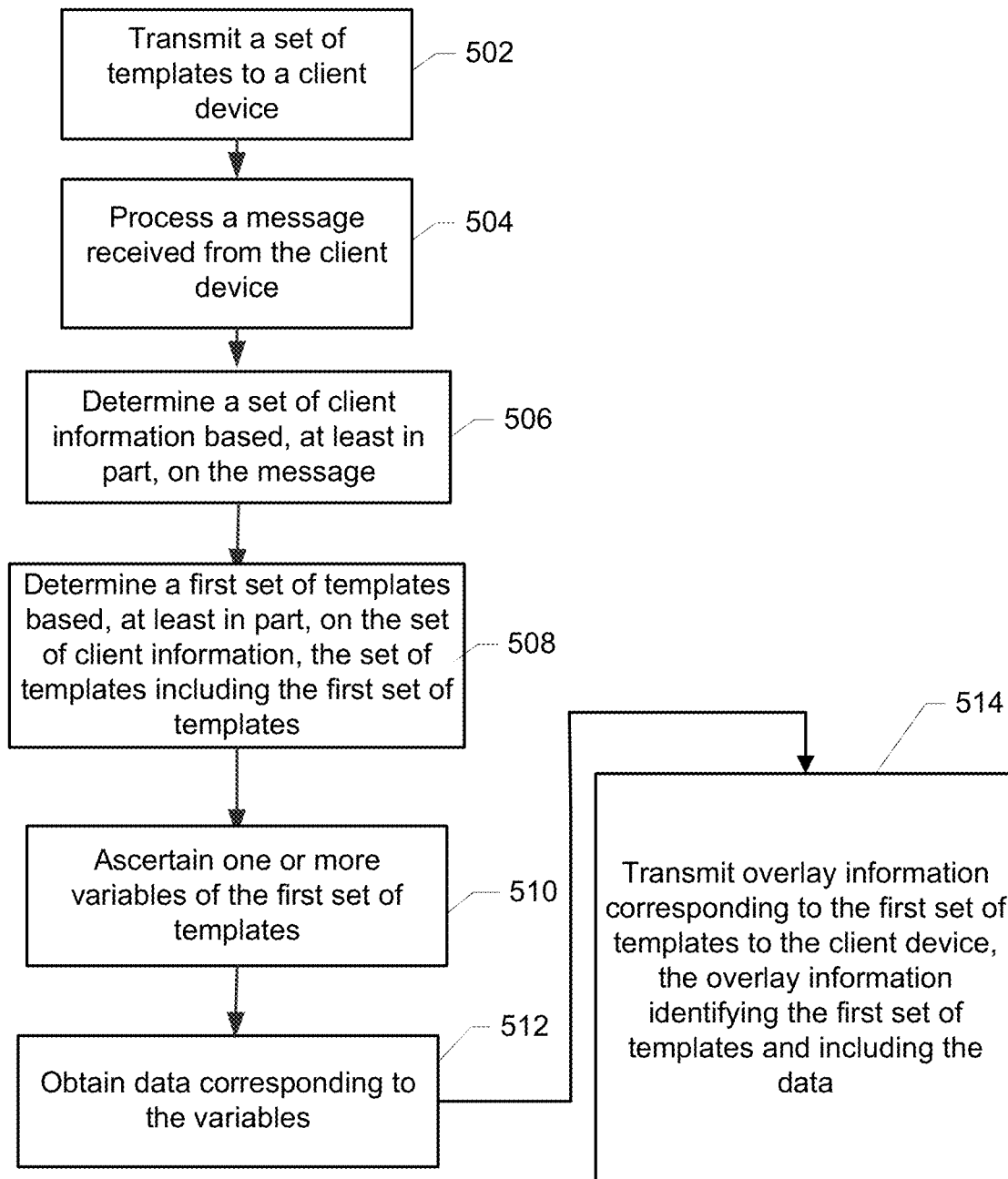
FIG. 5 shows a process flow diagram illustrating a method of providing an overlay within the context of a video streaming environment, in accordance with some implementations.

FIG. 5 shows a process flow diagram illustrating a method of providing an overlay within the context of a video streaming environment, in accordance with some implementations. A server system including one or more servers transmits a set of templates to a client device at 502, where each template in the set of templates has an associated template identifier and includes a set of computer-readable code configurable to facilitate providing a corresponding overlay graphical user interface (GUI) or portion thereof. In some implementations, the set of templates may be transmitted to the client device during a configuration process during which the client device is initialized with the set of templates. The configuration process may be performed responsive to a message received from the client device. For example, the message may be transmitted by the client device upon launching of an application on the client device. Alternatively, the configuration process may be initiated by the server system. By transmitting templates during a configuration process, this reduces the consumption of bandwidth during playback of video content by the client device, thereby minimizing the likelihood of delays or visual artifacts that may be detected by a user of the client device.

In some implementations, the set of templates is transmitted to the client device (e.g., subsequent to launching of the application) responsive to a request received from the client device, as will be described in further detail below. In this manner, the set of templates may be customized for the client device based on, for example, video content being rendered by the client device and/or characteristics of a user of the client device.

The set of templates may be transmitted via one or more files or data structures. For example, the server system may transmit one or more JavaScript Object Notation (JSON) files including the set of templates to the client device.

In some implementations, the server system transmits the same set of templates to a plurality of client devices including the client device. For example, the server system may transmit a library of templates maintained by the server system or a portion thereof to the client device. In other implementations, the server system selects the set of templates for the client device based, at least in part, on a profile associated with the client device.

In some implementations, at least a first template in the set of templates specifies a set of trigger events and indicates that a corresponding overlay GUI is to be presented within a portion of a display responsive to a trigger event in a first subset of the set of trigger events. In addition, the first template may indicate that the overlay GUI is to be removed from the display responsive to a trigger event in a second subset of the set of trigger events. The first template may also define or otherwise indicate a location and dimensions of the portion of the display in which the overlay GUI is to be rendered.

In other implementations, rather than removing or hiding the overlay GUI, the first template may indicate the overlay GUI is to be rendered using a different set of dimensions and/or at a different location within the display responsive to a trigger event in the second subset of the set of trigger events. Therefore, trigger events specified in a template may govern whether a corresponding overlay is generated and rendered, as well as the appearance of the overlay.

Trigger events may correspond to a status of a video player or a status of video content that is being rendered by the client device. Example trigger events include, but are not limited to a start full screen event, an end full screen event, a start ad event, an end ad event, a play video event, an end video event, a stop video event, a pause video event, a start channel event, a switch channel event, a start video playlist event, a skip event indicating a skip to a next video in a playlist, a switch video playlist event, a video fast forward event, a video rewind event, a show overlay request event, a hide overlay request event, rendering of an overlay corresponding to a second set of templates, rendering of video player controls (e.g., pause, play, rewind, fast forward), and/or a video state driven event. For example, a video state driven event may correspond to playback of a certain amount or percentage of a video content item or playlist. In some implementations, a video may be one of multiple videos in a playlist.

The server system processes a first message received from the client device at 504, where the first message includes a client identifier. The first message may be received during playback of first video content by the client device or may pertain to playback of the first video content. For example, the first message may request playback of the first video content. As another example, the first message may include information pertaining to the first video content being rendered at the client device, for which playback has been initiated, or for which playback has been requested. For example, the first message may further include a channel identifier (e.g., identifying a television channel or data stream), a playlist identifier, a feed identifier, and/or a content item identifier identifying a video content item.

In some implementations, the first message may include a request for data. For example, the first message may include a Hypertext Transport Protocol (HTTP) request. In some instances, the client device may identify a current template for which data is requested. However, in other instances, the first message does not identify overlay template(s) for which data is requested. Rather, the client device may rely on the server system to identify suitable templates for the client device. The server system may update a profile associated with the client device with information from the first message, enabling the server system to customize overlay data as described herein.

In some implementations, the first message is received after transmitting the set of templates to the client device. For example, the set of templates can include a plurality of templates transmitted during initialization.

The server system determines a first set of client information including first characteristics of the first video content based, at least in part, on the first message at 506. The first characteristics of the first video content may include a channel identifier, a feed identifier, a content item identifier identifying a video content item, attributes of a channel associated with the channel identifier, attributes of a feed associated with the feed identifier, or attributes of the video content item. The first set of client information may also include attributes of a user of the client device (e.g., according to a user profile associated with the user). Attributes of the user can include, for example, categories of content that interest the user and/or template preferences of the user.

In some implementations, the first set of client information includes event information identified from a digital calendar of the user. For example, the server system may communicate with a calendar application using an API of the calendar application to obtain or receive notifications of upcoming events (e.g., social events or meetings) that are in the calendar.

In some implementations, the server system identifies a profile associated with the client identifier from a plurality of profiles. The set of client information or a portion thereof may be determined based, at least in part, on the profile associated with the client identifier. The profile may include a channel identifier, a playlist identifier, a feed identifier, and/or a content item identifier identifying a video content item. For example, the profile may reflect content that may have been requested by the client device via the server system.

The server system may customize overlay information that identifies overlay templates on a per-client basis. In some implementations, the server system may select a first set of templates for the client device based, at least in part, on the first set of client information at 508. More particularly, the server system may select overlay templates based, at least in part, on characteristics of the video content and/or characteristics of a user of the client device (e.g., as reflected in a user profile associated with the user). For example, if a video playing on a display of the client device pertains to a particular company's business report, the server system may identify template(s) that are business-related such as a stock ticker template. In this example, the first set of templates includes the first template, as described above. In addition, the server system may customize the overlay information based, at least in part, on current event(s) that may be relevant to the user. Thus, the server system may select the first set of templates based, at least in part, on an event detected by the server system. For example, the event may include a national or local emergency, an emergency alert generated by an emergency alert system, or an upcoming event detected in a digital calendar of a user of the client device.

In some implementations, the server system may customize the overlay information based, at least in part, on state information obtained from the first message. The state information may include session information pertaining to a current session. For example, the state information may indicate an amount or percentage of a video that the user has played, an amount or percentage of a video playlist that the user has completed (e.g., a number of videos in the playlist that have been completed), which video in a playlist is currently being rendered, and/or a total time that the user has been watching a video or playlist.

The server system may customize the overlay information based, at least in part, on heuristics, a set of rules, or a machine learning model, as described herein. For example, the server system may apply a set of rules indicating a relative priority of templates or associated overlays. Therefore, the overlay information may indicate an order in which the overlays corresponding to the first set of templates are to be generated by the client device and/or a relative priority of the overlays.

In addition, the server system may customize the overlay information (e.g., identification of the first set of templates) based, at least in part, on contextual factors such as a time of day and/or the user's pattern of interactions with overlays. For example, the server system may identify a stock template for the user when the user is accessing his device in the morning hours.

The server system may identify the first set of templates from templates that were previously transmitted to the client device (e.g., prior to receiving the first message). The server system may select the first set of templates during an initialization process. Alternatively, the server system may select the first set of templates responsive to the first message or upon detection of an event such as a national or local emergency, an emergency alert generated by an emergency alert system, or upcoming events detected in a digital calendar of a user of the client device.

In some implementations, the server system selects the first set of templates using a set of rules or a computer generated model. In other implementations, the server system identifies the first set of templates by mapping the set of client information or a portion thereof to the first set of templates. For example, each template or group of templates may be associated with a corresponding set of characteristics that may be used to select the first set of templates. The set of characteristics associated with a template or group of templates may, for example identify the type of content rendered by the template (or group of templates). The computer generated model that is applied to select the first set of templates may, for example, include a plurality of variables, where the variables correspond to characteristics of the user, characteristics of the video content, and/or characteristics of the template (or group of templates).

In some implementations, the server system maintains, for each of a plurality of client devices including the client device, a list of templates that has been transmitted to the corresponding client devices. The server system may then determine whether the first set of templates is identified in the list of templates. In the event that the server system determines that it has already transmitted the first set of templates to the client device, it need not re-transmit the first set of templates. However, if the server system determines that it has not previously transmitted a template that it has selected for the client to the client device, it may transmit the selected template to the client device. In some implementations, the server system may compare a list of templates provided by the client device with a library of templates to identify templates that were not previously transmitted to the client device. Therefore, in some instances, the set of templates including the first set of templates (or portion thereof) may be transmitted to the client device after they have been selected rather than during a standard initialization process.

The server system ascertains one or more variables (e.g., parameters) of the first set of templates at 510. The server system may then obtain data corresponding to the variables at 512. The data may be obtained based, at least in part, on a profile associated with the client device. More particularly, the data may be customized based, at least in part, on characteristics of the video content and/or characteristics of the user (e.g, based upon a corresponding user profile). For example, the server system may obtain stock information pertaining to a company that is the focus of the video content being rendered. In some implementations, the server system obtains one or more data values corresponding to one or more of the variables by communicating with a third-party service via a corresponding API. In some implementations, the data may be customized based, at least in part, on user profiles of users sharing a set of characteristics of the user.

Data may be obtained based, at least in part, on a set of rules or a machine learning model, as described herein. For example, where the server system determines that viewers need more time to view a news headline, the server system may provide a larger value for a timing parameter associated with a news headline field.

The data can include data value(s) corresponding to one or more fields of an overlay template in the first set of templates. For example, the data can include character-based data, image data, animated image(s), video data, and/or audio data. As another example, the data can include complex data such as a map, graph, or travel directions, which may correspond to a field of a custom data type. In addition, the data can include a network address such as a uniform resource locator (URL) via which a client device can obtain data corresponding to one or more fields of an overlay template in the first set of templates. In some implementations, the data can include one or more timing value(s) corresponding to one or more timing parameter(s) of an overlay template in the first set of templates, a location at which the overlay is to be rendered within a display, and/or dimensions associated with the overlay.

In some implementations, the overlay template includes one or more default values. For example, a default value may include text or other form of data. In some instances, a default value includes a label such as "Weather." The overlay data can include value(s) that override corresponding default value(s) of the template.

The server system may transmit overlay information corresponding to the first set of templates to the client device at 514, where the overlay information identifies the first set of templates and includes overlay data, where the overlay data includes the data corresponding to the variables. For example, the servers may transmit an HTTP response including the overlay information to the client device. In some implementations, the server system transmits an instruction including the overlay information to the client device, where the instruction instructs the client device to generate one or more overlays using the overlay information. In some implementations, the overlay information indicates an order in which the first set of templates are to be rendered and/or an order in which data corresponding to fields of the first set of templates is to be presented within an overlay.

The server system may transmit the overlay information responsive to receiving the first message from the client device. Alternatively, the server system may transmit the overlay information at a later time responsive to an event detected by the server system. Example events include, but are not limited to, news events, alerts generated by an emergency alert system, and calendar events in a digital calendar of a user of the client device. In some implementations, the transmission of the templates is performed in conjunction with the transmission of the overlay information.

In some implementations, the first template includes one or more timing values or one or more timing variables representing one or more timing values. For example, the timing values may include one or more of: 1) a duration time that the overlay GUI is to be presented; 2) a delay time that is to lapse after detection of one of the first subset of the trigger events before the overlay GUI is to be presented; 3) a duration time that the overlay GUI is not to be presented (e.g., removed from the display) after detection of one of the second subset of the set of trigger events; or 4) a delay time that is to lapse after detection of one of the second subset of the trigger events before the overlay GUI is not presented (e.g., not visible or removed from the display). Timing values may also include, for example a start time and/or an end time. Therefore, the overlay information may include data value(s) corresponding to timing variable(s) of the first template.

In some implementations, a template in the first set of templates includes one or more timing values or one or more timing parameters variables representing one or more timing values. For example, the timing values may correspond to element(s) (e.g., a group of elements) within the overlay template. The timing values can include one or more of: 1) a start time; 2) an end time; 3) a duration time; 4) a delay time I; or 5) an interval time, as described herein. Thus, the overlay information may include data value(s) corresponding to timing variable(s) of the overlay template.

An overlay template in the first set of templates may identify a user interface element having a corresponding element type and indicate, for the user interface element, a corresponding action to be performed responsive to user interaction with the user interface element. For example, the action may include calling a URL to obtain data values corresponding to a plurality of elements of the overlay template or a child template of the overlay template. The overlay template may include the URL or, alternatively, the URL may be represented by a variable within the overlay template. Therefore, the overlay information may include a URL corresponding to a timing variable and via which data values corresponding to elements of the child template are to be obtained.

The first set of templates may include one or more types of templates. Examples of types of templates that may be transmitted to a client device include, but are not limited to: 1) a stock ticker template configured to render a stock ticker; 2) a weather template configured to render a weather overlay; 3) a voting template; 4) a news template configured to render a news overlay pertaining to a news event such as a national emergency or an alert; or 5) a notification template that notifies a user of calendar events obtained from a digital calendar of the user. At least a subset of the variables for which data is transmitted to the client device may correspond to one or more fields of an overlay template, as described herein. It is important to note that these examples are merely illustrative and a wide range of overlays may be generated for a variety of purposes.

In the example described above with reference to FIG. 5, it is assumed that the message received by the server system is from the client device rendering the video content. However, this example is merely illustrative. In some implementations, the message is received from a second client device, where both client devices are associated with the same user. The server may recognize that both client devices are associated with the same user via the user profile and use information in the message to customize the overlay templates and data, as described herein. For example, the message may indicate other content accessed by the second client device, an action performed by the second client device, or an application accessed by the second client device.

In some implementations, an application implementing an overlay engine can be downloaded to a client device. For example, the application may be downloaded from an application store. The overlay engine may be configured to communicate with a server system. In addition, the overlay engine may be configured to communicate with a video player of the client device or may be integral with the video player. An example of the operation of a client device implementing an overlay engine will be described in further detail below.

Figure 6:
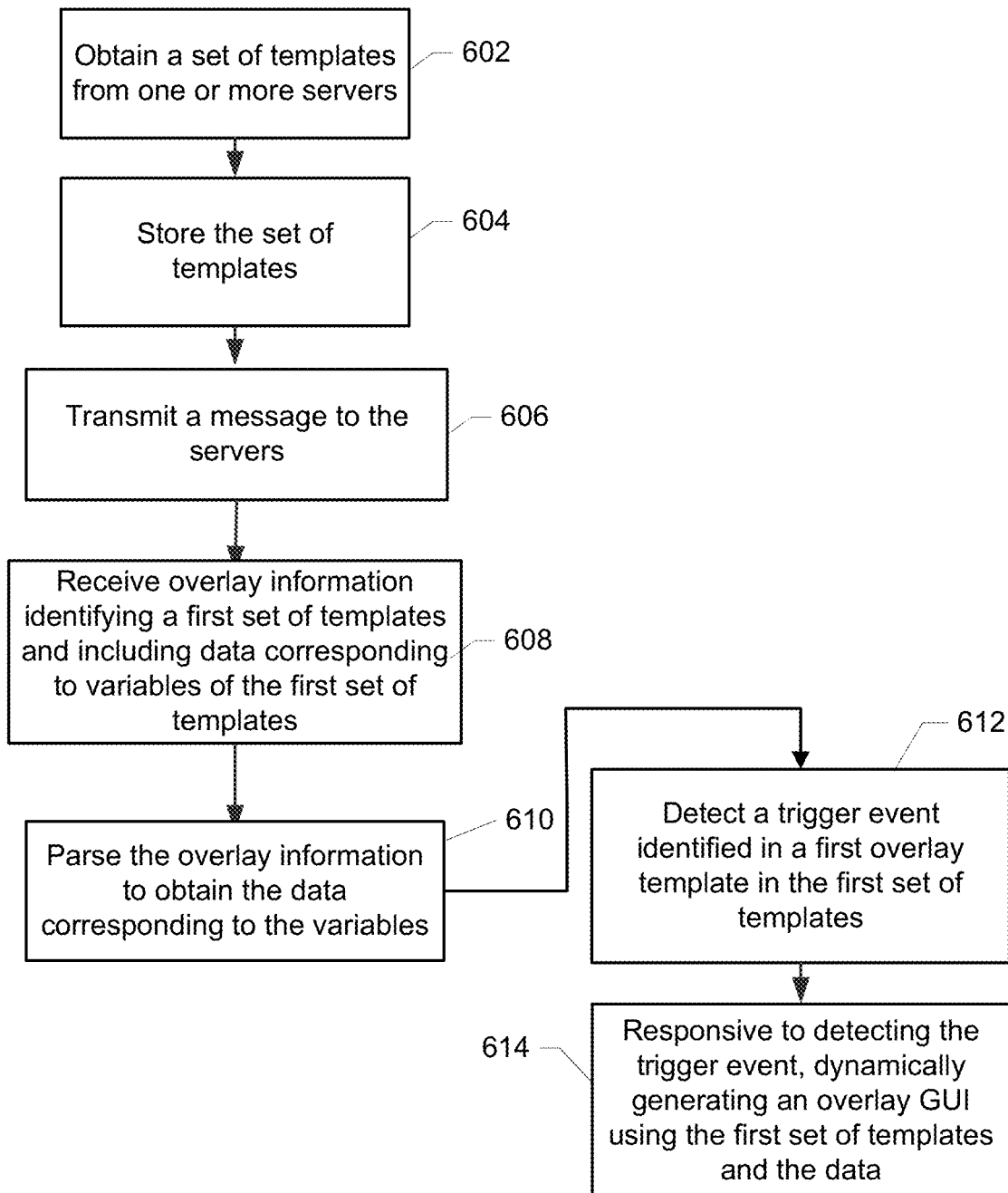
FIG. 6 shows a process flow diagram illustrating a method of rendering an overlay within a data streaming environment, in accordance with some implementations.

FIG. 6 shows a process flow diagram illustrating a method of rendering an overlay within a data streaming environment, in accordance with some implementations. A client device obtains a set of templates from a server system including one or more servers at 602. For example, the set of templates may include a plurality of templates. Each template in the set of templates has an associated template identifier and includes a set of computer-readable code configurable to facilitate providing a corresponding overlay graphical user interface (GUI) or portion thereof within a portion of a display. As described above, the set of templates may be obtained during an initialization process or at a subsequent time. An example of an initialization process will be described in further detail below with reference to FIG. 7.

In some implementations, the set of templates is received responsive to a request for templates transmitted by the client device to the servers. Such a request may be transmitted upon start up or loading of an application implementing an overlay engine, as described herein. A request for templates may also be transmitted responsive to detection by the client device of an event such as a request for playback of a video content item, a request to watch a channel or playlist on the device, a request to switch to another channel or playlist on the device, detection of a particular indicator or tag in metadata of the video content item, or detection of a particular action represented in content of the video content item. A request for templates may also be transmitted responsive to various user actions such as stopping a video content item, pausing a video content item, rewinding a video content item, fast forwarding the video content item, a show overlay request, or a hide overlay request.

In some implementations, at least a first template in the set of templates specifies a set of trigger events and indicates that a corresponding overlay GUI is to be presented within a portion of a display responsive to a trigger event in a first subset of the set of trigger events and indicating that the overlay GUI is to be removed from the display responsive to a trigger event in a second subset of the set of trigger events, the first template defining a location and dimensions of the portion of the display. In some implementations, a trigger event in the set of trigger events governs the timing with which an overlay GUI is to contracted, expanded, resized, and/or repositioned.

The client device may store the set of templates at 604. The set of templates may be stored in memory of the client device. In some implementations, the set of templates is cached for efficient retrieval at a later time when overlay information is received from the server system.

In some implementations, the set of templates is stored in the format in which they are received. In other implementations, the set of templates is processed and stored in a different format. For example, the set of templates may be parsed and stored in one or more files or data structures.

In some implementations, the overlay engine parses the set of templates and generates a lookup table that maps trigger events to corresponding templates to which the trigger events pertain. For example, the lookup table may identify a plurality of trigger events and identify, for each of the trigger events, any pertinent template(s) that include template specific trigger(s) associated with that trigger event.

The overlay engine may be configured to receive, detect, or otherwise obtain a status of a video player of the client device. More particularly, the overlay engine may receive, detect, or otherwise obtain information regarding events pertaining to video content rendered or requested by the client device. For example, the video content may include, but is not limited to, a video content item, a video playlist (or video content item(s) thereof), a channel, and/or a feed. A channel can include a television channel or a data stream provided by a content provider. The events may be generated externally or may be user-initiated, as will be described in further detail below. The client device transmits a first message including a client identifier to the servers at 606. The first message may be transmitted to the servers responsive to detection of an event such as a request for playback of a video content item, a request to watch a channel on the device, a request to change the channel on the device, a request to watch a playlist on the device, a request to watch a next video in the playlist, detection of a particular indicator or tag in metadata of the video content item, or detection of a particular action represented in content of the video content item. In some instances, the first message may be transmitted responsive to various user actions such as pausing the video content item, stopping the video content item, rewinding the video content item, fast forwarding the video content item, a show overlay request, or a hide overlay request. The first message may also be transmitted responsive to user interaction with a UI component of an overlay rendered by the client device or interaction with a video player control, as described herein. The first message may be transmitted during playback of first video content by the client device or may pertain to playback of the first video content by the client device. For example, the first message may be transmitted in anticipation of playback of the first video content. Thus, the first message may include information pertaining to the first video content such as, for example, a content identifier of the video content item, a channel identifier of a channel, a playlist identifier, or a feed identifier. In some implementations, the first message includes a request for data.

In some implementations, the first message includes state information. For example, the state information may include session information, as described herein. In addition, the state information may information such as a location of the client device.

In some implementations, the first message includes a request for templates. Thus, the set of templates or a subset thereof may be received from the servers responsive to the first message. Such a request may be composed such that it does not identify specific templates being requested. Rather, the request may identify templates that the client device has already received, enabling the servers to determine which templates it needs to send to the client device.

The client device receives overlay information from the servers at 608 based, at least in part, on the first message. The overlay information identifies a first set of templates and includes data corresponding to one or more variables of the first set of templates. For example, the first set of templates may include the first template. The first set of templates may be a subset of the set of templates (e.g., previously transmitted to the client device). The overlay information may be received responsive to the first message transmitted to the client device. The overlay information may be received from the servers in conjunction with the first set of templates or at a subsequent time.

In some implementations, the overlay information includes one or more JSON files. For example, the overlay information may map specific data value(s) to variable(s)/parameter(s) of an identified overlay template.

The client device may parse the overlay information at 610. More particularly, by parsing the overlay information, the client device may obtain template identifiers of the first set of templates and the data corresponding to the variables of the first set of templates. For example, a variable can correspond to a field of an overlay template, a timing variable of an overlay template, display variables/parameters (e.g., location, dimensions, font, opacity) of an overlay template, a variable associated with a user interface definition of the overlay template, etc.

The overlay engine may be configured to receive, detect, or otherwise obtain information regarding trigger events such as those described herein. Trigger events may include events pertaining to the status of a screen (i.e., display) in relation to video content rendered by a video player of the client device, as well events triggering the change in such status (e.g., user initiated command). For example, the overlay engine may detect when the video content is rendered in full screen (full screen event), when the full screen rendering has ended (end full screen event), when an ad is rendered (ad event), when rendering of the ad has ended (ad event), when a change in channel is requested (change channel event), when a playlist is selected, when a next video in a playlist is selected (e.g., change video event), when an overlay is rendered, when a set of player controls is rendered, a show overlay user request, a hide overlay user request, and/or the occurrence of video events. Example video events include, but are not limited to, start video, end video, stop video, pause video, rewind video, and fast forward video. Therefore, the overlay engine may dynamically generate overlay GUIs according to template-specific trigger events.

The overlay engine may include sets of computer-readable instructions (e.g., procedures and/or functions) that correspond to template-specific specific trigger events or other overlay designators (e.g., pertaining to transitions or rotations) within the template. For Thus, when the overlay engine detects a template-specific trigger event, the overlay engine may execute the corresponding set of computer-readable instructions. For example, a procedure or function may execute according to value(s) corresponding to the detected trigger event. The value(s) may be specified in a template having the detected trigger event (e.g., specified in association with a variable) and/or may be received in overlay information received from the server. The overlay engine may operate in a similar manner with respect to various designators within the template.

The overlay engine may be configured to detect events including template-specific trigger events. The client device may detect a first trigger event in the first subset of the set of trigger events at 612. Example trigger events include, but are not limited to, start full screen, end full screen, start ad, end ad, a play video event, a stop video event, a pause video event, a video fast forward event, a video rewind event, a start channel event, a switch channel event, a start playlist event, a skip video event indicating a skipping to a next video in a playlist, a show overlay request event, a hide overlay request event, rendering of an overlay corresponding to a second set of templates, and rendering of a set of video player controls. For example, where the user decides to watch a video in full screen or an ad starts, the client device may recognize the trigger event. In some implementations, a trigger event may be detected via indicator(s), which may be set to a first state (e.g., TRUE) 1) if the trigger event is detected and may be set to a second state (e.g., FALSE, 0) if the trigger event is not detected.

An identifier of template(s) for which an overlay is to be generated responsive to the trigger event may be ascertained. The client device may determine the overlay to be generated for example, based upon an overlay that is currently rendered (or identified in its state information) and/or by identifying the next template that is to be used to generate an overlay if an overlay is not currently rendered (e.g., from an ordered list of templates received from the server system if the server system has identified more than one overlay template). Thus, the client device may ascertain that a trigger event is detected and which overlay templates are to be used to generate an overlay GUI responsive to the trigger event.

The client device may track a state of the overlays rendered by the client device. For example, the client device may maintain identifiers of templates for which overlays are currently rendered and/or an identifier of the next template to be used to generate an overlay (e.g., based upon a list received from the server or a template hierarchy).

In this example, the trigger event that is detected corresponds to the first template. Responsive to detecting the first trigger event, the client device may dynamically generate an overlay GUI at 614 according to the first template and the obtained data such that the overlay GUI is presented within a first portion of a first display at the location defined in the first template, where the overlay GUI has the dimensions defined in the first template. More particularly, the client device may obtain template identifier(s) identifying the first template from the overlay information and retrieve the first template from the set of templates using the template identifier.

In some implementations, the overlay engine ascertains which template(s) include a template-specific trigger associated with the detected trigger event. For example, the overlay engine may perform a lookup in a lookup table that maps trigger events to relevant templates. Upon identifying template(s) mapped to the detected trigger event, the overlay engine may dynamically generate an overlay corresponding to at least one of the identified templates.

The overlay GUI and at least a portion of the obtained data may be presented according to the first set of templates. For example, the overlay GUI and/or data corresponding to fields of the first set of templates may be formatted according to locations, dimensions, fonts, opaqueness, and/or colors specified in the first set of templates and/or associated overlay data mapped to variables of the first set of templates.

In some implementations, the first set of templates may include an audio parameter. Audio data corresponding to the audio parameter may be received in the overlay data or may be specified in the first set of templates. For example, the audio data may be accessed via an audio file identified in the first set of templates or the overlay data. Audio data may be associated with a template-specific trigger, causing the audio data to be played according to the template-specific trigger.

In some implementations, the client device provides an indicator that notifies the user that an overlay is presented. The indicator may include visual and/or audio data. In this manner, a viewer's attention may be drawn to an overlay rendered by the client device.

The client device may generate or render an overlay or portion thereof according to timing information, which may be specified in the first set of templates and/or the overlay information. More particularly, the first set of templates may include one or more timing parameters and/or timing values. The overlay information may include one or more timing values that are mapped to corresponding timing parameter(s) of the first set of templates. A timing parameter and/or associated value may control or pertain to the rendering of an overlay and/or an element thereof, as specified within the first set of templates. For example, a timing parameter may be associated with a template-specific trigger event that governs the timing with which an overlay corresponding to the template or element thereof is to be generated or rendered, as described herein. Examples of timing parameters include, but are not limited to, a delay time, a duration time, and an interval time.

In some implementations, the first set of templates may associate a timing parameter/timing value with a particular action to be performed by a video player, as specified within the first set of templates. For example, the action may include show overlay or hide overlay. As another example, the action may include show element, hide element, or rotate element.

A delay time may designate a time that the client device is to wait, after detection by the client device of an event such as template-specific trigger event, before generating or rendering an overlay or element thereof. More particularly, the set of templates may include a delay parameter such that the delay parameter is associated with one or more events. Examples of events include, but are not limited to, trigger events such as user initiated events, video player events, and video events. A user initiated event may include, for example, hide overlay, show overlay, start channel, switch channel, play video, stop video, pause video, rewind video, fast forward video, select playlist, or skip to next video in playlist. A video player event may include the generation or rendering of another overlay, the removal or hiding of another overlay, or the rendering of an element of an overlay. A video event may include an event that can be detected, for example, in content or metadata of a video content item.

For example, where a particular template in the first set of templates specifies a delay time of 500 milliseconds in association with a trigger event such as a start ad event and an action of show overlay, a video player may generate a corresponding overlay after waiting 500 milliseconds after detecting a start ad event (e.g., based upon metadata associated with the video content). As another example, where the first set of templates specifies a delay time of 300 milliseconds in association with a trigger event such as an end ad event and an action of hide overlay, the video player may hide the overlay after waiting 300 milliseconds after detecting an end ad event.

A duration (e.g., interval) time may designate a total time that an overlay or element thereof is to be rendered before the overlay/element is to be removed, hidden, transitioned, animated, or otherwise moved to another position (e.g., rotated) within a display. In some implementations, a duration time may designate a total time that elements are to be rotated within an overlay.

In some implementations, timing parameter(s) and/or associated values may govern the timing with which display characteristics associated with an overlay or element thereof are changed. More particularly, a timing parameter may be associated with a set of display characteristics such as opacity, brightness, color, and/or position. A display characteristic may be specified in a template by a parameter and/or corresponding value.

A timing parameter may be used to create complex animations. More particularly, timing parameters may guide how fast an animation or transition occurs in relation to an overlay or element thereof. In some implementations, timing parameters may facilitate a transition, rotation, and/or other animation of one or more overlays and/or elements thereof. For example, a timing parameter of a stock ticker template may guide the timing of rotation of elements within a stock ticker.

In some implementations, a timing parameter may be used to create a more pleasurable viewing experience. More particularly, abruptly rendering or hiding of an overlay or element thereof can be visually jarring to a user. Timing parameters may be advantageously used to provide a smooth transition between the rendering, hiding, or repositioning of an overlay. Similarly, timing parameters may be used to provide a smooth transition between the rendering, hiding, re-positioning, or other movement of an element of an overlay. For example, one or more timing parameters may guide a transition such as a fade in, fadeout, slide in, or slide out of an overlay or element(s) thereof.

The overlay engine is configured to "interpret" an overlay template and recognize variables such as timing parameters/ variables within the overlay template. For example, the overlay engine may be configured to recognize the duration (or interval) variable as identifying a duration with which a corresponding overlay or element is to be rendered. More particularly, the overlay engine may be configured with a set of computer-readable instructions such that, when a corresponding variable or designator is identified within an overlay template, the overlay engine performs a corresponding action by executing a corresponding set of computer-readable instructions of the overlay engine. In this example, the overlay engine executes the set of computer-readable instructions corresponding to the variable "duration" and applies the corresponding value to render the overlay for the specified duration. It is important to note that this example is merely illustrative, and the overlay engine may recognize a variety of variables such as those described herein.

In some implementations, the overlay GUI and/or additional overlay GUI(s) may be presented according to timing value(s)/variable(s) in the first set of templates. Since the overlay engine is configured to "interpret" value(s)/ variable(s) in overlay templates, the client device may manage transitions associated with overlay(s) and/or elements of the overlay(s) using the timing value(s)/variable(s) by updating the overlay(s) accordingly.

For example, a stock ticker template and/or corresponding overlay information may identify a plurality of fields and indicate an order in which values corresponding to the fields are to be rendered as they are rotated within a corresponding ticker. Assuming the value for a corresponding variable (e.g., duration or interval variable) of the template is 3 seconds, elements or values associated with the corresponding fields may be rotated across a corresponding stock ticker overlay every 3 seconds. In this manner, elements of an overlay or associated data may be animated.

Overlay information and/or templates may guide the animation of overlays or elements thereof. For example, an overlay or element thereof may be transitioned into or out of a display, which may be performed in a specific direction (e.g., from top to bottom, left to right), within a specific time period, and/or according to a particular speed. A transition into or out of a display may be designated, in a template, by a corresponding designator such as "introtransition" or "outrotransition." A direction, time period, speed, and/or other parameter may be designated via variable(s) and/or value(s) of a template or corresponding overlay information. The overlay engine may recognize the designator and render corresponding overlay(s) according to a set of computer-readable instructions of the overlay engine corresponding to the designator in combination with value(s) and/or variable(s), as described herein.

The client device may render one or more overlays at any given time. Thus, it is possible for a client device to render multiple overlays simultaneously via a display. In addition, a client device may render overlays in a sequential manner. For example, a client device may render a child overlay corresponding to a child template responsive to detection of user interaction with a user interface component of a parent template.

In some implementations, the overlay information sent by the server system to the client device includes a macro or placeholder that is to be filled in by the client device with information that it has received from the server system or otherwise obtained. This information may include, but is not limited to, the current video playing title, the next video that will play in a playlist, the channel name, the current position of a video in a playlist, the number of videos in a playlist, the amount of watch time remaining for a video or set of videos, and/or the publisher of a video or set of videos. Information that is filled in by the client device may include information that was previously transmitted by the server system to the client device and stored for later use (e.g., to fill in macro(s) and/or placeholder(s)) at the client device.

In some implementations, overlays may be rendered according to an order indicated in the overlay information. For example, where overlays are to be rendered sequentially, the overlays may be rendered according to the order indicated. In addition, the overlays may be rendered according to priorities of the corresponding templates. For example, if an overlay having a lower priority is rendered in a position that overlaps with an overlay having a higher priority that is triggered, the lower priority overlay may be paused while the overlay having a higher priority is generated and rendered. When the rendering of the higher priority overlay is completed, it may be removed and the lower priority overlay may be resumed.

In some implementations, where a second overlay is to be generated such that it overlaps with a first overlay that has already been generated, the client device may pause the currently/previously rendered first overlay and generate the second overlay. Once the second overlay is generated and rendering of information of the second overlay is completed, the second overlay may be removed or hidden and the previously generated first overlay may be resumed. The pausing of the first overlay, generation of the second overlay, and/or resuming of the first overlay may be performed according to prioritization rules of the overlay engine, rules of template(s) associated with the first and/or second overlays, and/or trigger event(s) of the template(s) associated with the first and/or second overlays. For example, a trigger event of a second template associated with the second overlay may dictate that when the second overlay and another overlay overlap, the other overlay is to be paused until rendering of the second overlay is completed.

In some implementations, overlays may be generated sequentially according to a video playlist received from the servers. More particularly, a playlist may indicate an order in which multiple video content items are to be played. The overlay information may generated such that it pertains to one or more of the video items identified in the playlist. Therefore, an overlay may be generated such that it is synchronized with video content identified in a playlist received from the servers.

The client device may receive a playlist identifying a plurality of video content items and indicating an order in which the content items are to be played by the client device. As the client device switches between the video content items within the playlist (either automatically or responsive to a user request), a new overlay may be generated. The new overlay may replace a previously rendered overlay. More particularly, when a video content item in the playlist is selected by a user or playback is otherwise initiated, this may trigger the generation of an overlay based upon template(s) identified in the overlay information (e.g., in association with the video content item). For example, the overlay may be generated according to template-specific trigger(s) within the pertinent template(s). In some instances, the client device may transmit a message identifying the video content item to the servers, causing the servers to transmit new overlay information to the client device.

The first set of templates and/or overlay information may explicitly or implicitly indicate portion(s) of the first display in which the first video content is to be rendered. For example, the server system may instruct the video player to "shrink" the video content to the portion of the display. The first video content may be rendered in a second portion of the first display, wherein the first portion and the second portion are non-overlapping. Alternatively, the first video content may be rendered in a second portion of the first display, wherein the overlay GUI overlaps the first video content rendered in the second portion of the first display.

In some implementations, the client device may detect a second trigger event in the second subset of the set of trigger events. Responsive to detecting the second trigger event, the client device may update the first display such that the overlay GUI is removed or hidden from the first portion of the first display. In this manner, template-specific triggers may be implemented to trigger the rendering and hiding of overlays. In some implementations, a template-specific trigger may also cause a resizing of an overlay, re-positioning of an overlay, contraction of an overlay, or expansion of an overlay.

Figure 7:
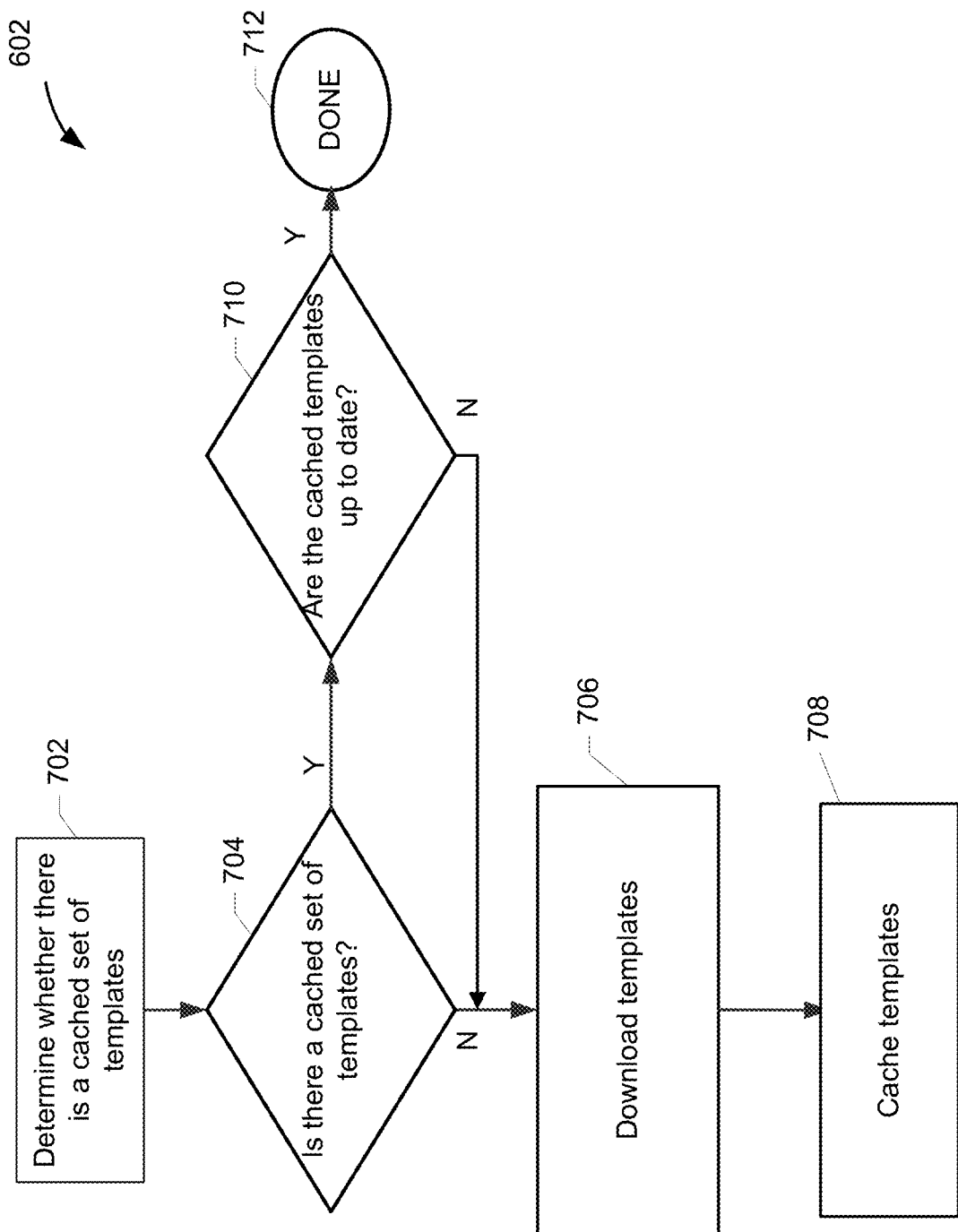
FIG. 7 shows a process flow diagram illustrating a method of configuring a client device with a set of overlay templates, in accordance with some implementations.

FIG. 7 shows a process flow diagram illustrating a method of configuring a client device with a set of overlay templates, in accordance with some implementations. As described above, the configuration may be performed upon the launching of an application implementing an overlay engine at a client device or at startup of the client device. The client device may determine whether a set of overlay templates is stored at the client device. For example, the client device may check a designated location in memory (e.g., a particular directory or folder). As another example, the client device may check for a template file having a name that consists of or includes a pre-defined sequence of characters.

In this example, the client device determines whether a set of overlay templates is cached at the client device at 702. The client device may then obtain and store a set of overlay templates in memory of the client device according to a result of the determination.

In some implementations, the client device obtains a template file that includes the set of templates. For example, the template file may have a pre-defined name and a version. Since the set of templates may be transmitted to the client device via a single template file, bandwidth may be conserved. If the client device determines that there is not a cached set of overlay templates at 704, the client device may obtain a set of overlay templates from a server system at 706. More particularly, the client device may download a set of templates by calling an overlay API of the server system. The client device may then cache the obtained set of templates at 708.

Alternatively, if the client device determines that there is a cached set of overlay templates at 704, the client device may determine whether the set of overlay templates is up to date at 710. In some implementations, the client device checks whether the version of the template file is the most recent version of the templates. In other implementations, the client device may check a timestamp that indicates the last time that overlay templates were downloaded. For example, the client device may check the timestamp(s) associated with the template(s) or an indicator that maintains a record of the last time that overlay templates were downloaded. The set of overlay templates may be considered to be up to date if the time stamp is greater than or equal to a particular threshold time stamp (e.g., one day prior to the current date). If the set of templates is up to date, the process ends at 712. However, if the set of templates is not up to date, the client device may proceed to obtain and store a set of templates at 706.

In the above description, the operation of an overlay engine is described within the context of a video streaming system. While an overlay engine may be implemented as a standalone application, the overlay engine may also be integral with a video player, a video content service, or other application.

In systems in which a video player is independent from the overlay engine, focus handling may be performed to transfer control between the video player and the overlay engine. Focus handling can transfer control from the overlay engine to a video player, enabling the video player to receive and process user interactions relating to the video player. Similarly, focus handling may be performed to transfer control from the video player to the overlay engine to enable the overlay engine to receive and process user interactions with user interface components of overlays. The transfer of control may be initiated responsive to a specific pre-defined user interaction with the client device or an associated input device. For example, callback function(s) may be implemented to transfer control between a video player and overlay engine. In this manner, an overlay engine may be integrated with a video player.

Any of the disclosed implementations may be embodied in various types of hardware, software, firmware, and combinations thereof. For example, some techniques disclosed herein may be implemented, at least in part, by computer-readable media that include program instructions for performing various services and operations described herein. Examples of program instructions include both machine code, such as produced by a compiler, and files containing higher-level code that may be executed by a computing device such as a server or client device. Examples of computer-readable media include, but are not limited to: magnetic media such as hard disks; optical media such as flash memory; magneto-optical media; and hardware devices specially configured to store program instructions, such as read-only memory (ROM) devices and random access memory (RAM) devices. A computer-readable medium may be any combination of such storage devices.

Any of the operations and techniques described in this application may be implemented as software code to be executed by a processor using any suitable computer language such as, for example, object-oriented techniques. The software code may be stored as a series of instructions or commands on a computer-readable medium. Computer-readable media encoded with the software/program code may be packaged with a compatible device or provided separately from other devices (e.g., via Internet download). Any such computer-readable medium may reside on or within a single computing device or an entire computer system, and may be among other computer-readable media within a system or network.

While various implementations have been described herein, it should be understood that they have been presented by way of example only, and not limitation. Thus, the breadth and scope of the present application should not be limited by any of the implementations described herein, but should be defined only in accordance with the following and later-submitted claims and their equivalents.

The invention claimed is:

1. A computer program product, comprising one or more non-transitory computer-readable media having computer program instructions stored therein, the computer program instructions being configured such that, when executed by a client device, the computer program instructions cause the client device to:

process, by a client device, overlay information received from one or more servers, the overlay information identifying a first set of overlay templates stored at the client device and including data corresponding to one or more variables of the first set of overlay templates, the first set of overlay templates including a first template, the first template in the set of overlay templates specifying a set of trigger events and indicating that a corresponding overlay GUI is to be presented by the client device within a portion of a display responsive to detection by the client device of a first trigger event in a first subset of the set of trigger events, the overlay information being received responsive to a message transmitted by the client device;

parse, by the client device, the overlay information to obtain the data corresponding to one or more variables of the first set of overlay templates;

detect, by the client device, the first trigger event; and responsive to detecting the first trigger event, dynamically generate, by the client device, an overlay graphical user interface (GUI) according to the first set of overlay templates and the obtained data such that the overlay GUI is presented within a first portion of a first display.

2. The computer program product as recited in claim 1, the first subset of the set of trigger events comprising one or more of: a start full screen event, an end full screen event, a start ad event, an end ad event, a play video event, a stop video event, a pause video event, a video fast forward event, a video rewind event, a start channel event, a switch channel event, a start playlist event, a switch playlist event, a skip video event pertaining to a video playlist, a show overlay request event, a hide overlay request event, rendering of an overlay corresponding to a second set of templates, or rendering of a set of video player controls.

3. The computer program product as recited in claim 1, the computer program instructions further configured to cause the client device to:

responsive to detecting a second trigger event in a second subset of the set of trigger events, update the first display such that the overlay GUI is no longer visible.

4. The computer program product as recited in claim 3, the second subset of the set of trigger events comprising one or more of: a start full screen event, an end full screen event, a start ad event, an end ad event, a play video event, a stop video event, a pause video event, a video fast forward event, a video rewind event, a start channel event, a switch channel event, a start playlist event, a switch playlist event, a skip video event pertaining to a video playlist, a show overlay request event, a hide overlay request event, rendering of an overlay corresponding to a second set of templates, or rendering of a set of video player controls.

5. The computer program product as recited in claim 1, the computer program instructions further configured to cause the client device to:

obtain one or more template identifiers identifying the first set of overlay templates from the overlay information.

6. The computer program product as recited in claim 1, the computer program instructions further configured to cause the client device to:

transmit, by a client device, a first message including a client identifier of the client device to a server, the overlay information being received responsive to the first message.

7. The computer program product as recited in claim 6, wherein the first message is transmitted responsive to one or more of: 1) detection of a change in channel via the client device; or 2) a request, received by the client device, for first video content.

8. The computer program product as recited in claim 6, the first message being transmitted during playback of first video content by the client device or pertaining to playback of the first video content by the client device.

9. The computer program product as recited in claim 8, the first message further comprising at least one identifier associated with the first video content, the identifier including one or more of: a channel identifier, a playlist identifier, a feed identifier, or a content item identifier identifying the first video content.

10. The computer program product as recited in claim 1, the first template comprising one or more timing values, the timing values comprising one or more of: 1) a duration specifying a time that the overlay GUI or element thereof is to be presented responsive to detection by the client device of a trigger event in the first subset of the set of trigger events; or 2) a delay specifying a time that is to lapse after detection of a trigger event in the first subset of the set of trigger events before the overlay GUI or element thereof is to be presented.

11. The computer program product as recited in claim 1, an overlay template in the first set of overlay templates comprising one or more of: 1) a delay time that is to lapse before initiation of a transition of one or more elements of a corresponding overlay GUI, according to the overlay template, responsive to detection of a template-specific trigger of the overlay template; 2) a duration representing a time over which the one or more elements are to be transitioned to one or more corresponding positions within the corresponding overlay GUI according to the overlay template; or 3) an interval time for which the elements are to be rendered at the positions before a subsequent transition of the elements is to occur.

12. The computer program product as recited in claim 1, the variables comprising one or more timing variables representing one or more of: 1) a delay time that is to lapse before initiation of a transition of one or more elements of a corresponding overlay GUI, according to an overlay template in the first set of overlay templates, responsive to detection of a template-specific trigger of the overlay template; 2) a duration representing a time over which the one or more elements are to be transitioned to one or more corresponding positions within the corresponding overlay GUI according to the overlay template; or 3) an interval time for which the elements are to be rendered at the positions before a subsequent transition of the elements is to occur.

13. The computer program product as recited in claim 1, an overlay template in the first set of overlay templates identifying a user interface element having a corresponding element type and indicating, for the user interface element, a corresponding action to be performed responsive to user interaction with an instance of the user interface element that is rendered within a corresponding overlay GUI.

14. The computer program product as recited in claim 1, the first set of overlay templates including a hierarchy of two or more templates, the first set of overlay templates including a parent template and a child template, the parent template including a variable corresponding to a user interface component of the parent template, the variable representing a uniform resource locator (URL) via which data values corresponding to elements of the child template are to be obtained responsive to user interaction with the user interface component.

15. The computer program product as recited in claim 1, the overlay information indicating at least one of: an order of templates in the first set of overlay templates or a prioritization of templates in the first set of overlay templates.

16. The computer program product as recited in claim 1, the first template indicating that the corresponding overlay GUI is to be resized or repositioned responsive to detection by the client device of a trigger event in the set of trigger events.

17. An apparatus, comprising:
a processor; and
a memory, the memory storing thereon computer-readable instructions configured to:
process, by a client device, overlay information received from one or more servers, the overlay information identifying a first set of overlay templates stored at the client device and including data corresponding to one or more variables of the first set of overlay templates, the first set of overlay templates including a first template, the first template in the set of overlay templates specifying a set of trigger events and indicating that a corresponding overlay GUI is to be presented by the client device within a portion of a display responsive to detection by the client device of a first trigger event in a first subset of the set of trigger events, the overlay information being received responsive to a message transmitted by the client device;
parse, by the client device, the overlay information to obtain the data corresponding to one or more variables of the first set of overlay templates;
detect, by the client device, the first trigger event; and
responsive to detecting the first trigger event, dynamically generate, by the client device, an overlay graphical user interface (GUI) according to the first set of overlay templates and the obtained data such that the overlay GUI is presented within a first portion of a first display.

18. The apparatus as recited in claim 17, the first subset of the set of trigger events comprising one or more of: a start full screen event, an end full screen event, a start ad event, an end ad event, a play video event, a stop video event, a pause video event, a video fast forward event, a video rewind event, a start channel event, a switch channel event, a start playlist event, a switch playlist event, a skip video event pertaining to a video playlist, a show overlay request event, a hide overlay request event, rendering of an overlay corresponding to a second set of templates, or rendering of a set of video player controls.

19. The apparatus as recited in claim 17, the computer program instructions further configured to cause the client device to:
responsive to detecting a second trigger event in a second subset of the set of trigger events, update the first display such that the overlay GUI is no longer visible.

20. The apparatus as recited in claim 19, the second subset of the set of trigger events comprising one or more of: a start full screen event, an end full screen event, a start ad event, an end ad event, a play video event, a stop video event, a pause video event, a video fast forward event, a video rewind event, a start channel event, a switch channel event, a start playlist event, a switch playlist event, a skip video event pertaining to a video playlist, a show overlay request event, a hide overlay request event, rendering of an overlay corresponding to a second set of templates, or rendering of a set of video player controls.

21. The apparatus as recited in claim 17, the overlay information indicating at least one of: an order of templates in the first set of overlay templates or a prioritization of templates in the first set of overlay templates.

22. The apparatus as recited in claim 17, the first template indicating that the corresponding overlay GUI is to be resized or repositioned responsive to detection by the client device of a trigger event in the set of trigger events.

23. A method, comprising:
processing, by a client device, overlay information received from one or more servers, the overlay information identifying a first set of overlay templates stored at the client device and including data corresponding to one or more variables of the first set of overlay templates, the first set of overlay templates including a first template, the first template in the set of overlay templates specifying a set of trigger events and indicating that a corresponding overlay GUI is to be presented by the client device within a portion of a display responsive to detection by the client device of a first trigger event in a first subset of the set of trigger events, the overlay information being received responsive to a message transmitted by the client device;
parsing, by the client device, the overlay information to obtain the data corresponding to one or more variables of the first set of overlay templates;
detecting, by the client device, the first trigger event; and
responsive to detecting the first trigger event, dynamically generating, by the client device, an overlay graphical user interface (GUI) according to the first set of overlay templates and the obtained data such that the overlay GUI is presented within a first portion of a first display.

24. The method as recited in claim 23, the first subset of the set of trigger events comprising one or more of: a start full screen event, an end full screen event, a start ad event, an end ad event, a play video event, a stop video event, a pause video event, a video fast forward event, a video rewind event, a start channel event, a switch channel event, a start playlist event, a switch playlist event, a skip video event pertaining to a video playlist, a show overlay request event, a hide overlay request event, rendering of an overlay corresponding to a second set of templates, or rendering of a set of video player controls.

25. The method as recited in claim 23, further comprising:
responsive to detecting a second trigger event in a second subset of the set of trigger events, updating the first display such that the overlay GUI is no longer visible.

26. The method as recited in claim 25, the second subset of the set of trigger events comprising one or more of: a start full screen event, an end full screen event, a start ad event, an end ad event, a play video event, a stop video event, a pause video event, a video fast forward event, a video rewind event, a start channel event, a switch channel event, a start playlist event, a switch playlist event, a skip video event pertaining to a video playlist, a show overlay request event, a hide overlay request event, rendering of an overlay corresponding to a second set of templates, or rendering of a set of video player controls.

27. The method as recited in claim 23, further comprising:
obtaining one or more template identifiers identifying the first set of overlay templates from the overlay information.

28. The method as recited in claim 23, further comprising:
transmitting, by a client device, a first message including a client identifier of the client device to a server, the overlay information being received responsive to the first message.

29. The method as recited in claim 28, wherein the first message is transmitted responsive to one or more of: 1) detection of a change in channel via the client device; or 2) a request, received by the client device, for first video content.

30. The method as recited in claim 28, the first message being transmitted during playback of first video content by the client device or pertaining to playback of the first video content by the client device.

31. The method as recited in claim 30, the first message further comprising at least one identifier associated with the first video content, the identifier including one or more of: a channel identifier, a playlist identifier, a feed identifier, or a content item identifier identifying the first video content.

32. The method as recited in claim 23, the first template comprising one or more timing values, the timing values comprising one or more of: 1) a duration specifying a time that the overlay GUI or element thereof is to be presented responsive to detection by the client device of a trigger event in the first subset of the set of trigger events; or 2) a delay specifying a time that is to lapse after detection of a trigger event in the first subset of the set of trigger events before the overlay GUI or element thereof is to be presented.

33. The method as recited in claim 23, an overlay template in the first set of overlay templates comprising one or more of: 1) a delay time that is to lapse before initiation of a transition of one or more elements of a corresponding overlay GUI, according to the overlay template, responsive to detection of a template-specific trigger of the overlay template; 2) a duration representing a time over which the one or more elements are to be transitioned to one or more corresponding positions within the corresponding overlay GUI according to the overlay template; or 3) an interval time for which the elements are to be rendered at the positions before a subsequent transition of the elements is to occur.

34. The method as recited in claim 23, the variables comprising one or more timing variables representing one or more of: 1) a delay time that is to lapse before initiation of a transition of one or more elements of a corresponding overlay GUI, according to an overlay template in the first set of overlay templates, responsive to detection of a template-specific trigger of the overlay template; 2) a duration representing a time over which the one or more elements are to be transitioned to one or more corresponding positions within the corresponding overlay GUI according to the overlay template; or 3) an interval time for which the elements are to be rendered at the positions before a subsequent transition of the elements is to occur.

35. The method as recited in claim 23, an overlay template in the first set of overlay templates identifying a user interface element having a corresponding element type and indicating, for the user interface element, a corresponding action to be performed responsive to user interaction with an instance of the user interface element that is rendered within a corresponding overlay GUI.

36. The method as recited in claim 23, the first set of overlay templates including a hierarchy of two or more templates, the first set of overlay templates including a parent template and a child template, the parent template including a variable corresponding to a user interface component of the parent template, the variable representing a uniform resource locator (URL) via which data values corresponding to elements of the child template are to be obtained responsive to user interaction with the user interface component.

37. The method as recited in claim 23, the overlay information indicating at least one of: an order of templates in the first set of overlay templates or a prioritization of templates in the first set of overlay templates.

38. The method as recited in claim 23, the first template indicating that the corresponding overlay GUI is to be resized or repositioned responsive to detection by the client device of a trigger event in the set of trigger events.

* * * * *